(12) United States Patent
McKay et al.

(10) Patent No.: US 9,071,974 B2
(45) Date of Patent: Jun. 30, 2015

(54) MOBILE TELEPHONE FIREWALL AND COMPLIANCE ENFORCEMENT SYSTEM AND METHOD

(75) Inventors: Robert McKay, Sterling, VA (US); Sam Emara, Fairfax, VA (US); Steve Hildner, Leesburg, VA (US); Thomas Shanley, Brambleton, VA (US); Wesley Driver, Herndon, VA (US); Jay Lukin, Dallas, TX (US); Terry Bahr, Santa Clarita, CA (US); Tim Berzins, Annapolis, MD (US); Mihaela Mihaylova, Schaumberg, IL (US); Nathan Klonoski, Arlington, VA (US)

(73) Assignee: Oceans Edge, Inc., Reston, VA (US)

( * ) Notice: Subject to any disclaimer, the term of this patent is extended or adjusted under 35 U.S.C. 154(b) by 1212 days.

(21) Appl. No.: 12/493,214

(22) Filed: Jun. 28, 2009

(65) Prior Publication Data
US 2009/0325615 A1 Dec. 31, 2009

Related U.S. Application Data

(60) Provisional application No. 61/076,665, filed on Jun. 29, 2008.

(51) Int. Cl.
*H04W 4/00* (2009.01)
*H04W 12/12* (2009.01)
(Continued)

(52) U.S. Cl.
CPC ........... *H04W 12/12* (2013.01); *H04L 63/0853* (2013.01); *H04L 63/14* (2013.01); *H04L 63/02* (2013.01); *H04M 1/663* (2013.01); *H04M 1/72552* (2013.01); *H04W 4/14* (2013.01)

(58) Field of Classification Search
CPC ..... H04W 12/08; H04W 4/003; H04W 12/06; H04W 4/14; H04L 63/02; H04L 63/10; H04L 63/14; H04L 63/0583

USPC ................ 726/11, 22–25; 455/466, 558, 411; 713/168
See application file for complete search history.

(56) References Cited

U.S. PATENT DOCUMENTS 6,763,467 B1 * 7/2004 Radatti et al. ................... 726/24
6,816,455 B2 11/2004 Goldberg et al.
(Continued)

FOREIGN PATENT DOCUMENTS

EP 1420600 * 7/2003 ............... H04Q 7/22
EP 1 420 600 A1 5/2004

OTHER PUBLICATIONS

Huang, Jianyong et al, Design and Implementation of Personal Firewalls for Handheld Devices, 7th World Multiconference on Systemics, Cybernetics and Informatics (SCI 2003), Jul. 2003, 458-463.

(Continued)

*Primary Examiner* — Saleh Najjar
*Assistant Examiner* — Feliciano Mejia
(74) *Attorney, Agent, or Firm* — David P. Lentini

(57) ABSTRACT

Methods, systems, and software for mediating SMS messages, and especially type 0 SMS messages, in a wireless mobile communications device configured to send and receive data using a GSM protocol and including a subscriber identity module ("SIM") including electronic hardware and computer software executed by the hardware such that the SIM is configured to send, receive, and process messages using a Short Message System ("SMS") between the wireless mobile communications device and a communications network. One aspect includes a method for mediating SMS messages comprising: configuring electronic hardware on the wireless mobile communications device to implement a firewall on the wireless mobile communications device, the firewall configured to identify and optionally mediate infrastructure SMS messages.

21 Claims, 16 Drawing Sheets

(51) Int. Cl.
　　　H04L 29/06　　　(2006.01)
　　　H04M 1/663　　　(2006.01)
　　　H04M 1/725　　　(2006.01)
　　　H04W 4/14　　　(2009.01)

(56) References Cited

U.S. PATENT DOCUMENTS

| | | | |
|---|---|---|---|
| 6,941,467 | B2 | 9/2005 | Judge et al. |
| 7,225,466 | B2 | 5/2007 | Judge |
| 7,353,394 | B2* | 4/2008 | Marmigere et al. .......... 713/170 |
| 7,369,867 | B2 | 5/2008 | Zabawskyj et al. |
| 7,653,401 | B2* | 1/2010 | Qu et al. ........................ 455/466 |
| 7,743,336 | B2* | 6/2010 | Louch et al. .................. 715/766 |
| 7,853,784 | B2* | 12/2010 | Allison et al. ................. 713/154 |
| 7,925,282 | B2* | 4/2011 | Kim ................................ 455/466 |
| 7,945,955 | B2* | 5/2011 | Katkar ............................ 726/22 |
| 8,131,281 | B1* | 3/2012 | Hildner et al. ................. 455/418 |
| 2003/0040299 | A1 | 2/2003 | Laumen et al. |
| 2004/0143751 | A1 | 7/2004 | Peikari |
| 2005/0020289 | A1 | 1/2005 | Kim et al. |
| 2005/0122930 | A1 | 6/2005 | Zhao et al. |
| 2005/0144528 | A1 | 6/2005 | Bucher et al. |
| 2005/0165928 | A1 | 7/2005 | Shu et al. |
| 2005/0186974 | A1 | 8/2005 | Cai |
| 2005/0186976 | A1 | 8/2005 | Benco et al. |
| 2006/0105750 | A1 | 5/2006 | Zabawskyj et al. |
| 2006/0174028 | A1 | 8/2006 | Zhu |
| 2006/0272013 | A1 | 11/2006 | Kilgore |
| 2007/0083792 | A1 | 4/2007 | McDermott et al. |
| 2007/0169093 | A1 | 7/2007 | Logan et al. |
| 2007/0186070 | A1 | 8/2007 | Federa et al. |
| 2007/0225020 | A1 | 9/2007 | Chang |
| 2007/0249374 | A1 | 10/2007 | Hu et al. |
| 2007/0270169 | A1 | 11/2007 | Buchhop et al. |
| 2007/0281718 | A1 | 12/2007 | Nooren |
| 2008/0010676 | A1 | 1/2008 | Racz et al. |
| 2008/0085728 | A1 | 4/2008 | Reding et al. |
| 2008/0127345 | A1* | 5/2008 | Holtmanns et al. ............. 726/23 |
| 2010/0227588 | A1* | 9/2010 | Bradley ........................ 455/411 |

OTHER PUBLICATIONS

Susilo, Willy, Russell James Ang, Cameron Allen George McDonald, and Jianyong Huang, Personal Firewall for Pocket PC 2003: Design and Implementation, 19th International Conference on Advanced Information Networking and Applications (AINA'05), 2005, 661-666, vol. 2.
Patent Cooperation Treaty ISR for PCT-US09-48988, International Searching Authority, Oct. 6, 2009.
TrendMicro, Trend Micro Mobile Security, 2007.
AirScanner, AirScanner Mobile Firewall Users Manual, Sep. 2004, www.airscanner.com.
Anthasoft, AnthaFirewall: The Firewall for Mobile Devices, 2007, www.anthasoft.com.
Peter Sayer, Check Point, Novell work to secure PDAs, Mar. 2002, archives.cnn.com.
BusinessWire, Cloudmark\®, AerVox and Datatronics Partner to Protect Mobile Operators From SMS and MMS Threats Against Their Network, Mar 2009, it.tmcnet.com.
Checkpoint, FireWall Now Supports 3G Standard, Feb. 2003, www.3G.co.uk.
MobileCollect, How It Works, 2009, www.mobilecollect.com.
John Heasman, Implementing and Detecting a PCI Rootkit, Nov. 2006, www.ngssoftware.com.
Sandra Kay Miller, Juniper Netwoks' NetScreen 5GT Wireless Device is affordable and secure, Aug. 2005, searchsecuritychannel. techtarget.com.
SecurityParknet, Kaspersky protects corporate users of mobile devices from malware and SMS spam, Dec. 2007, www.securitypark. co.uk.
Sean Buckley, Keeping attacks on SMS at bayTekelec's TekMedia SMS provides holistic view of SMS threats, Nov. 2007, www. telecommagazine.com.
McAfee, McAfee Delivers on Triple Play Promise With Mobile Security OfferingMcAfee VirusScan Mobile now available, Nov. 2007, www.mcafee.com.
ClickApps, mcleaner, Product Description, Apr. 2009, www. clickapps.com.
McTelmobility3, mcTel SMS FirewallSMS Spam Filtering—Anti-Fraud—SmartMessaging—Parental Control, Product Datasheet, Sep. 2006, www.mctel.net.
BlueFireSecurityTechnologies, Mobile Security Enterprise Edition, 2006, www.bluefiresecurity.com.
Marketwire, NCP engineering Releases VPN Client for Symbian OS-Based Mobile Devices, Jul 2008, findarticles.com.
NCPEngineeringGmbH, NCP Secure Symbian Client Data Sheet, Feb. 2009, www.ncp-e.com.
Iohana Georgescu, Nokia Files for Mobile Firewall PatentThat will be part of the mobile network itself, Apr. 2007, news.softpedia.com.
Symantec, Norton Smartphone Security: Mobile antivirus and antispam safeguards your privacy against mobile threats, 2009, www. symantec.com.
Robert Lemos, PCI cards the next haven for rootkits?, Nov. 2006, www.securityfocus.com.
PocketGearcom, Qimsoft SMS Assistant 1.51, Jan. 2009, classic. pocketgear.com.
FreeDownloadsCenter, Restore SIM Card SMS 3.0.1.5, Mar. 2009, www.freedownloadscenter.com.
Bryan Betts, Smartphones get a firewall, Nov. 2006, www.theregister. co.uk.
SMobileSystems, SMobile Security Shieldfor Symbian Series 60, Product Datasheet, Feb. 2009, secure.smobilesystems.com.
MobileCollect, SMS Firewall, Product Description, Mar. 2009, www.mobilecollect.com.
CMTechnology, SMS firewall (for operators), Product Literature, Mar. 2009, www.cmtechnology.com.
HewlettPackard, SMS Firewall—service details, 2007, h41140. www4.hp.com.
Elatec, SMS Firewall and Smart Messaging With Parental Control, Product Literature, Apr. 2009, www.elatecworld.com.
Tekelec, SMS Routing, Product Description, Mar. 2009, www. tekelec.com.
BelgacomInternationalCarrierServices, SMS Transit, 2007, www. belgacom-ics.com.
Snapfiles, SpywareBlaster, Jun. 2008, www.snapfiles.com.
Symantec, Symantec Mobile Security 4.0 for Symbian Protects Smartphones From Viruses, Hackers, and Other Malicious Threats, May 2005, www.symantec.com.
Gavrilamartau, Total Uninstall—powerful installation monitor and advanced uninstaller, Product Description, Mar. 2009, www.martau. com.
TrendMicro, Trend Micro Mobile Security 5.1Comprehensive enterprise protection for mobile devices, Product Datasheet, Jan. 2009, us.trendmicro.com.
SymbianV3com, Trend Micro Mobile Security—Virus and Firewall Protection for S60 3rd Edition, Mar. 2007, symbianv3.com.
Keith Levkoff, Trend Micro patent suite roils the antivirus waters, Aug. 2005, www.theedison.com.
Nicolas Brulez, Unscrambling Custom obfuscation and Executable "infection", Mar. 2008, securitylabs.websense.com.
McAfee, W32/Winko.worm, Jul. 2007, vil.nai.com.
WindowsForMobileDevicescom, Windows Mobile gains "safe mode", Dec. 2008, www.windowsfordevices.com.

* cited by examiner

SMS-DELIVER Message Format

User Data (UD) Format

MOBILE TELEPHONE FIREWALL AND COMPLIANCE ENFORCEMENT SYSTEM AND METHOD

1 CROSS REFERENCE TO RELATED APPLICATION

The present application claims priority under 35 U.S.C. §119(e) to provisional U.S. Patent Application Ser. No. 61/076,665, filed 29 Jun. 2008, the disclosure of which is incorporated herein by reference in its entirety and for all purposes.

2 NOTICE OF COPYRIGHT

Portions of this patent application include materials that are subject to copyright protection. The copyright owner has no objection to the facsimile reproduction by anyone of the patent document itself, or of the patent application, as it appears in the files of the United States Patent and Trademark Office, but otherwise reserves all copyright rights whatsoever in such included copyrighted materials.

3 BACKGROUND

3.1 Field of the Invention

The exemplary, illustrative technology herein relates to wireless telecommunication. More particularly, the exemplary, illustrative technology herein relates to systems, software, and methods for monitoring and managing SMS messaging, and the effects of such monitoring and managing on various devices, with or without the knowledge or assistance of a device user. Methods of preventing or misleading device tracking attempts through SMS messaging are also described. The technology herein has applications in the areas of computer and electronic communications security, telecommunications, business methods for providing regulatory compliance, defense, law enforcement, and surveillance avoidance arts.

3.2 The Related Art

Wireless mobile devices are common today, and increasingly they are relied upon for both business and personal communication. As used herein, the phrase "wireless mobile devices" includes pagers, mobile phones, combination devices that include the functionality of mobile phones, pagers, and personal digital assistants (PDAs) or any other devices having similar capabilities to enable wireless communication of voice and/or data from a plurality of locations or while in transit between locations. These devices typically allow the exchange of textual information as well as voice and data, without the need for a physical connection (i.e., a wire or cable) between the devices, typically by use of electromagnetic transmissions (e.g. radio and/or light waves). Devices using wireless communications can be at a fixed location or be mobile. Fixed location wireless device allow wireless communication between a fixed location and a mobile device or between devices at two fixed locations. Mobile wireless devices permit communication between mobile devices; as well as between mobile wireless devices and fixed location devices. Mobile devices typically communicate using radio-frequency transmissions, though some can also communicate by way of modulated light waves, usually in the infrared frequency spectrum.

Wireless communication can be accomplished by short-range transmissions, where the distances are measured in inches or feet, such as wireless Local Area Networks (WLANs) (e.g. Wi-Fi, supported by the Wi-Fi Alliance) or wireless personal area networks (PANs, e.g., Bluetooth), or longer-range transmissions, where distances are measured in miles, such as cellular technologies (e.g., cdmaOne, defined by the International Telecommunications Union, an agency of the United Nations, which is often referred to as "CDMA") or Global System for Mobile communications (GSM: originally from Groupe Special Mobile, of France). These capabilities result in a plurality of ways to access wireless mobile devices, from locations that are near the wireless mobile device as well as locations that could be anywhere in the world.

GSM is a commonly used mobile telephony standard that includes not only voice communication capability, but also specifies protocols for transmitting non-voice digital data. Short Message System (SMS) is one such protocol. SMS data is sent over the control channel used to communicate device presence to a cell tower or other cellular network access point, do call setup, assign frequencies for voice calls, and the like. SMS can be used to support services such as Wireless Application Protocol (WAP) alerts or access, and "text messaging" as well as Multimedia Messaging Service (MMS), which is a telecommunications standard for sending messages that include multimedia objects such as images, audio, video and Rich Text. These protocols can also be used to move data and software over-the-air (OTA) to and from mobile wireless devices for purposes such as installing software updates or communicating between users. The ability to exchange data wirelessly enables many useful functions of wireless mobile devices, and has helped make them almost ubiquitous for both business and personal uses. This capability also creates some problems, such as making it harder for organizations to monitor and control the movement of sensitive data, permitting installation of various forms of harmful software, such as viruses, covert monitoring applications, device trackers, identity theft software and software for authorizing purchases of goods or services without the device owner's knowledge or permission, and software that permits unauthorized data access. Means to detect, control and/or block these types of activities are needed, but current methods do not adequately accomplish this. In some cases only some communication paths are controlled (e.g. TCP/IP over WiFi), and in others only some protocols, or portions of protocols, are dealt with (e.g. SMS text messaging, but not other types of SMS messages).

In some cases the control or blocking of harmful activities is done in the network access provider's infrastructure, not in the mobile device; and if means are used to contact the device directly, without going through the network access provider, or if the device is taken to a location where a different network provider's service is used ("roaming") that does not supply such protection to the device, the device, and its information and user, become vulnerable. The critical aspects of the means of detecting, controlling and/or blocking harmful activities need to be accomplished on the mobile device itself to eliminate these problems.

SMS, as used on current devices, was defined in the GSM series of standards in 1985 as a means of sending messages of up to 160 characters to and from GSM mobile devices. The popularity of SMS "text messaging" has led to SMS, or protocols substantially similar to SMS, being implemented on non-GSM networks and devices, often with gateway systems providing protocol translations between systems. Most SMS messages sent today by users are mobile-to-mobile "text messages", though the standard supports other types of SMS messaging as well, such as WAP Push Service Load/ Indication and SMS Class 2 SIM specific messages. Most users lack understanding of these other message types, and even when a device includes a capability to limit or disable them, users may not make use of this, or may use it incorrectly. This leaves the devices vulnerable to cyber attack. Other mobile devices may lack such limiting or disabling capabilities entirely, or provide them in ways that are insufficiently flexible and so discourage their use.

SMS messages comprise various information fields that specify their purpose, content, format, and handling. For example, the TP-PID field specifies the Protocol Identifier, which either refers to the higher layer protocol being used, or indicates interworking with a certain type of telematic device, and the TP-DCS field, which specifies the DataCodingScheme (defined in 3GPP TS 23.038) that can be used to specify the character type in use for the message, whether the message is classless or of class 0, 1, 2, or 3, message compression, etc. Used together, the TP-PID and TP-DCS fields determine the "message type" as used herein and described in Table 1.

Message types not typically available to applications running on the wireless mobile device, such as Class 2 messages that are forwarded to the SIM for processing (e.g., ANSI-136 R-DATA and SIM Data download), or Type 0 "silent SMS" messages that can be deleted after they are acknowledged, are referred to herein as "infrastructure" messages. Some message types can be infrastructure messages or not, depending on the setting of the TP-DCS field, such as the Application message types, while others are defined by standards as being Class 2 messages and therefore infrastructure messages, such as the ANSI-136 R-DATA and SIM Data download variants of the data message type. Table 2 describes which message types can be infrastructure messages, and whether these should be mediated when being sent from a wireless mobile device ("MO", for "Mobile Originated") or sent to a wireless mobile device ("MT", for "Mobile Terminated"), and what the concerns are for each (see Table 2).

TABLE 1

Message Types

| Message Type | TP-PID | TP-DCS | Comment |
| --- | --- | --- | --- |
| Text | 00000000 - Simple Text SMS | xxxxxxxx - any | TP-DCS is typically 0-general data coding, uncompressed, no class, default alphabet. |
| | 001xxxxx - telematic interworking | xxxxxxxx - any | |
| Application | 000xxxxx - SME-to-SME protocol | xxxxxxxx - any | SM-AL protocol ID in bits 4:0 of TP-PID. PID of 0 used for MS to SC SM transfer |
| Data | 01111100 - ANSI-136 R-DATA | 1111xx10 or 00x1xx10 - Class 2 | SM sent to (U)SIM. See GSM TS 11.14 and 3GPP TS 31.102 |
| | 01111101 - ME Data download | 1111xx01 or 00x1xx01 - Class 1 | |
| | 01111111 - SIM Data download | 1111xx10 or 00x1xx10 - Class 2 | SM sent to (U)SIM. See GSM TS 51.011 and 3GPP TS 31.102 |
| Message Replace | 01000xxx - Replace SM Type 1-7 01011111 - Return Call Message | xxxxxxxx - any | |
| Detect/Locate | 01000000 - SM Type 0 | xxxxxxxx - any | "Silent SMS" |
| Device Settings | 01111110 - ME Depersonalization SM | 00010001 - Uncompressed, Default Alphabet, and Message Class 1 (MEspecific) | see 3GPP TS 22.022 |
| Unknown | 11xxxxxx - SC specific use | xxxxxxxx - any | Use not defined in the standard |

TABLE 2

Mediation and Infrastructure

| Message Type | Mediated MO? | Mediated MT? | Possibly Infra-structure? | Concerns |
|---|---|---|---|---|
| Text | Y | N | N | Improper information sharing. |
| Application | Y | Y | Y | Information leaks, application abuse and exploitation. |
| Data | Y | Y | Y | Software and (U)SIM interaction. |
| Message Replace | N | N | N | No serious concerns. |
| Detect/ Locate | N | N | Y | With radio equipment, or SP cooperation, can locate device to a cell. In some cases more precisely Change of SP, denial of use, malware. |
| Device Settings | N | Y | Y | Change of SP, denial of use, malware install, information leaks, location detection, etc. |
| Unknown | Y | Y | Y | Unknown |

A wireless mobile device can, in some exemplary devices such as cell phones, comprise a "handset" and a Subscriber Identity Module, or "SIM". Typically a handset comprises user interface subsystems, one or more receivers and transmitters, at least one processor (CPU), and the wireless mobile device's operating system. The construction of wireless mobile devices such as telephony devices is well understood to those skilled in the art.

SIMs are usually one part of a removable smart card, and the combination of a SIM and the smart card is commonly referred to as a "SIM card". In some exemplary GSM 3G devices these are referred to as a "USIM card". Both SIM and USIM will be referred to herein as "SIM" when the context does not require specification of the 2G or 3G versions specifically. SIM cards securely store the service-subscriber key used to identify a subscriber to a given wireless network, and they also typically support a "SIM Application Toolkit" (STK), which is a standard of the GSM system that enables the SIM to initiate actions that can be used for various value added services, such as payment authorization for purchases. In GSM 2G networks, the STK is defined in the GSM 11.14 standard. In GSM 3G networks, the USIM Application Toolkit (USAT) is the equivalent of the STK, and is defined in standard 3GPP 31.111. (Both STK and USIM are referred to herein as "STK" when the context does not require specification of the 2G or 3G versions specifically.)

The STK comprises a set of functions programmed into the SIM card that define how the SIM can interact directly with the mobile device (commonly referred to in this context as a "handset"), and/or the network. The STK provides functions that can give commands to the handset, for example: to display a menu and ask for user input, to dial phone numbers, to send SMS, to communicate with handset via AT commands, to obtain Network Measurement Report (NMR) information regarding device location, or to control or access other device features. These functions enable the SIM to carry out an interactive exchange between a network application and the end user, and to provide or control access to the network. Details of STK capabilities and use are defined in the 3rd Generation Partnership Project (3GPP) Specification of the SIM Application Toolkit (STK) for the Subscriber Identity Module-Mobile Equipment (SIM-ME) interface (also known as the 11.14 specification) and related standards documents.

In addition to the STK, SIM cards can implement additional systems for supporting application programs that run on the SIM card. There are a plurality of systems and standards for such support, including the Open Platform and Java Card standards. Some standards support only one operating system or hardware smart card, others, like the Java Card standard, are supported on a plurality of smart cards under a plurality of operating systems. These systems can provide mechanisms for installing applications programs, selecting applications to execute, and means for the application programs to interact with each other or with the world outside of the smart card they are running on. Such systems typically provide for only one application to execute at a time, as is the case with the Java Card 2.2.1 standard, but others can provide for a plurality of applications to be active at the same time, or in a time-sliced multi-processing arrangement as is well known to those of skill in the art. These systems can provide mechanisms to isolate applications from each other, or provide only limited or controlled interaction between applications. For example, the Java Card 2.2.1 standard includes a "firewall" capability, sometimes referred to as a "sandbox", that prevents applications from accessing each other's data or code objects, unless the applications are part of the same package or take special steps to permit such access. This "firewall" is between applications and does not include capability for filtering, blocking or otherwise monitoring or controlling the application's interaction with the world outside of the smart card, however, so the term "firewall" in this instance can be misleading. Due to the open-ended capabilities of applications installed on SIM cards there is a potential security hazard to SIM cards and to devices in which the cards are installed, similar to that of other general purpose computing devices. Given the use of SIM cards as means to authenticate users for purchase of goods and services over the network, such security hazards can involve identity theft and monetary losses. Therefore, methods for monitoring and controlling the communication activities of applications running on SIM cards in wireless mobile devices are needed to prevent such applications from being used to harm the wireless mobile device, the data held on or passing through such devices, for improper information disclosure, purchase authorization, or other abuses.

Although SIM cards originated with GSM devices, the cards have proven so useful that other network types have adopted similar mechanisms. For example, CDMA systems have implemented a SIM-like device called a Removable User Identity Module (R-UIM), and a more advanced version of this called a CDMA Subscriber Identity Module (CSIM), which are cards developed for CDMA handsets that are equivalent to a GSM SIM. The CSIM is physically compatible with GSM SIM cards, can fit into existing GSM phones, and is an extension of the GSM standard but is capable of working on both CDMA and GSM networks. As used hereinafter, "SIM card" refers to SIM, R-UIM, CSIM or similar devices where the capabilities are these are equivalent.

Most mobile wireless devices include a capability to be "provisioned", that is to have their software updated and configuration values set, using the above-described OTA methods. In some cases, software can be installed even without notification to, or permission from, the user of the mobile device. Physical security of the device can protect against the installation of unwanted software using wired means, such as cables or by exchanging the SIM card, but due to the possibility of installing software OTA, physical security methods alone are not sufficient to protect a device. One common method of OTA provisioning involves the use of SMS messages that are interpreted by systems already installed on the device. In response to properly constructed SMS messages, a device can be induced to report its status, accept software updates, accept changes to device configuration, report the device's current location, and many other actions. Some such systems are incorporated into the SIM, the device OS or device hardware, while others are optionally installed by the network provider or device user.

It is not usually practical to block all OTA software installations and configuration changes, because many service providers use these methods to update the device's operating system, network access configuration, and other applications. Blocking all OTA software installations and configuration changes would interfere with normal device use and the functioning of the provider's system. Users may also want to acquire additional software OTA for legitimate purposes. Some means is needed to prevent, or at least detect, OTA installation of some software, while permitting OTA installation of other software on wireless mobile devices. Such means would enable the device user to be aware of OTA installation of software, and the user could then take appropriate action, such as approving the installation, rejecting the installation, or not using the device until improperly installed software can be removed. Similarly, it would be desirable to establish rules that control whether specific software or configuration changes can be made on a mobile device, and the circumstances under which they might be made.

Improper software installation is not the only hazard created by the use of wireless mobile devices. The potential for their use in improperly disclosing confidential information, whether intentionally or accidentally, is of great concern to government security agencies, the military, corporate entities, and others who deal with regulated, confidential, or classified information. Monitoring of an installation's phone and computer systems, and searching vehicles and packages at gates or exits is no longer sufficient to prevent classified or confidential information being sent to parties that should not have access to it. In some cases, there can be regulatory requirements to record certain information exchanges for future reference, such as is required by the Sarbanes-Oxley Act of 2002 (Public Law 107-204). Means to address such requirements exist for e-mail, telephone calls, traditional postal mail, and other forms of communication, but means to address SMS messages, or other similar protocols, such as MMS, are lacking. Attempting to monitor communications by means such as tracking e-mail messages at an e-mail server can be defeated by some device capabilities, such as the BLACKBERRY "PIN-to-PIN" message system, where e-mail messages are sent from a first wireless mobile device to a second wireless mobile device without using an e-mail server, or by configuring the mobile device to use a different e-mail server that does not perform tracking of messages. Some devices can make use of encryption to render messages opaque to monitoring attempts located on infrastructure components, such as SMSC or e-mail servers. Some means for monitoring and controlling information sent from or to a wireless mobile device, whether intentionally by the device user, or without the device user's knowledge or permission, and whether encrypted or not, and regardless of the path taken by the information, is required to restore the ability to monitor and control, or at least detect, information transmission between a wireless mobile device and other systems. There is a need for monitoring and control located in the wireless mobile device itself, because only systems located in the wireless mobile device have access to all information sent to or from the device in an accessible (not encrypted) form.

OTA message traffic can currently be monitored or captured using network hardware, such as the Short Message Service Center (SMSC), telephone switch, Internet-to-SMS gateway, or other server at a service provider. This requires explicit cooperation by the service provider and can require expensive monitoring equipment, making this method suitable for some government agencies, such as law enforcement, but not practical for use by corporate entities or other civilian organizations that do not have such access and may lack the required expertise or equipment. When using this technique, device control to prevent undesired use of the device, such as to improperly disclose information, is generally limited as well. Methods that operate on the device to detect, capture, store and relay SMS message traffic are needed.

In addition to the issues related to external message traffic, additional problems can be generated by message traffic between the SIM and the handset (sometimes referred to as "SIM pro-active commands"). Applications running in the SIM can cause the handset to make voice calls, send SMS messages, launch the handset's browser, display messages to the user, etc. Applications running in the handset can request that the SIM send messages, such as for purposes of making purchases, or to reveal the device's current location. Some means of monitoring and/or controlling such SIM/handset interaction is needed to limit potential harm to the device, device misuse, or improper information exchange.

FIG. 1 depicts the structure of an SMS Message as delivered to a wireless mobile device from an SMSC (SMS-DELIVER messages) which is familiar to those having ordinary skill in the art. The message contains a number of fields containing information useful to describe the message data, its routing, format, and other aspects. The Message Type Indicator (MTI) (1100) specifies the type of SMS message (i.e. deliver, submit, status report, etc.). More Messages To Send (MMS) (1110) tells the receiving device whether there are additional messages waiting. Reply Path (RP) (1120) specifies whether a Reply Path is set in the message. User Data Header Indicator (UDHI) (1130) specifies whether the User Data field contains only short message data, or whether the beginning of the User Data field contains a header in addition to the short message data. Status Report Indicator (SRI) (1140) specifies whether a status report should be returned for this SMS message. Originator Address (OA) (1150) specifies the address of the originator of the message. Protocol Identifier (PID) (1160) specifies information about the type and content of the message, such as whether the message is a Short Message (i.e. a "text message"), an SMS Type 0 message, a data download to the handset or to the SIM, etc. SMS Type 0 messages are used to query the device and are not stored, but can, on most provider networks, result in a receipt acknowledgment being sent to the requester, without notification to the receiving device user. On some provider networks, such "silent acks" are not permitted. Whether an acknowledgment of receipt (a "receipt ack") is sent also depends on a bit being set in the request message, and in most cases this bit is not set, but this is an option for the sender of the message, and is not under control of the receiving device. By sending a message with the receipt ack bit set, a device can be made to re-register with the network to send the ack, and this can be used, with the proper equipment, to locate the device with respect to a particular cell. In some provider networks failure to send such acks can result in SMS messages being blocked until the message requesting the ack has been acknowledged, so simply blocking transmission of such acks is not practical. Data Coding Scheme (DCS) (1170)

specifies additional information about the data format of the message, such as the character-encoding scheme as specified in the 3GPP TS 23.038 standard document. Service Center Time Stamp (SCTS) (1180) specifies the local time at which the message was sent. The User Data length (UDL) (1190) specifies the length of the User Data field. The User Data (UD) (1200) field contains the message data.

SMS messages sent from a wireless mobile device to an SMSC (SMS-SUBMIT messages) have a slightly different structure from those sent to wireless mobile devices as is known in art and shown in FIG. 2. Some fields, such as MTI (2100), RP (2130), UDHI (2150), PID (2180), DCS (2190), UDL (2210) and UD (2220) are similar to the same fields in SMS-DELIVER messages. Other fields include the following: Reject Duplicated (RD) (2110) specifies whether duplicate messages should be accepted or not; Validity Period Format (VPF) (2120) specifies whether the optional Validity Period (VP) (2200) field is present; Status Receipt Request (SRR) (2140) specifies whether a receipt report is wanted for this message; Message Reference (MR) (2160) specifies an incrementing integer that identifies this particular SMS-SUBMIT message; and Destination Address (DA) (2170) specifies the address of the intended recipient of the SMS message. Validity Period (VP) (2200) specifies how long the message can remain undelivered before the SMS message expires.

In both SMS-DELIVER and SMS-SUBMIT messages, the User Data (UD) field can contain either a Short Message, or a Header and a Short Message. The UDHI field specifies the presence of a Header in the UD. FIG. 3 depicts the format of a User Data (UD) field as known to those having ordinary skill in the art. The UD field contains a Header (3100-3190) in addition to a Short Message (3200). The Length of User Data Header field (3100) specifies the Header's length and is followed by one or more Info Element (IE) entries, each of which comprises three fields: an Info Element ID (3110, 3140 & 3170), an Info Element Length (3120, 3150, & 3180), and an Info Element Data field (3130, 3160, & 3190). The Info Element entries specify additional information or further describe the Short Message content. For example, an IE with an ID of '09' (hexadecimal) specifies a Wireless Control Message (WAP). An IE with an ID of '20' (hexadecimal) specifies an RFC 822 e-mail header. An IE with an ID of '70' through '7F' (hexadecimal) specifies a SIM Toolkit Security Header, as defined in 3GPP TSG 31.115. Info Element ID values essentially specify the "message type" of the SMS message.

The SMS message fields described above permit identification of the message type, its size, and its content; so that different types of SMS messages, those originating at various addresses, being sent to various addresses, or which specify particular operations, can be treated in different ways by the device OS as well as by exemplary embodiments of the current invention. Within the message structure described above, SMS messages exist in a variety of forms, and are used for a plurality of purposes. The most widely known form is called Simple Text SMS. Simple Text SMS messages are used by device users to send short text messages to other devices, and can be used by harmful software to exfiltrate (i.e. the opposite of "infiltrate" . . . to transfer out of a targeted device into one or more second devices) data or to receive control commands. SMS messages are limited to a few dozen bytes each, but by breaking messages into segments, sending each segment in a separate SMS message and reassembling the segments into the original message on the receiving device, larger messages can be transmitted. SMS Simple Text messages can easily be used to disclose confidential information. A method of monitoring, limiting, or blocking SMS Simple Text messages is required if prevention or detection of improper uses of SMS Simple Text capabilities is to be achieved, such as by blocking the sending of SMS Simple Text messages or recording them to detect and inhibit their use to disclose confidential information. Known methods for blocking SMS text messages typically exist as infrastructure applications running on network provider server equipment, not in the mobile device, and are usually intended to prevent sending of "spam" messages or to prevent Simple Text SMS messages from specific senders. SMS text message blocking on the wireless device is known, and generally involves use of "allow lists" (numbers permitted to send SMS text messages), or "deny lists" (numbers not permitted to send SMS text messages). Such applications can often be subverted or bypassed, such as by using a device that is not on a deny list or that is listed on an allow list, and there is nothing to prevent the device user from disabling or removing the blocking application, making such programs unsuitable for involuntary use (e.g. for corporate or government security monitoring and preservation). Other known applications can suppress SMS text messages based on message content, but such applications operate at the application programming interface (API) level, and access already-delivered messages from the "inbox" (i.e. the received message storage area). While this may be sufficient to prevent a user from seeing unwanted messages, there is usually no way to prevent other applications from having access to the received SMS message, or to know if one or more of them have processed the message content prior to suppression of the message. Dealing with messages after they have been received and processed into the device inbox is insufficient for preventing harm from hostile SMS messages. Unrestricted and unmonitored Simple Text SMS messages pose a risk for sensitive information dissemination, and can contribute to compromising the security of a device by providing a control and update pathway for covertly installed software. A means of blocking, filtering, modifying and/or recording Simple Text SMS messages is needed, and for some purposes this means should be resistant to disabling or removal by the device user, or may need to be covertly implemented so that the user is unaware that the blocking, filtering, modifying and/or recording of Simple Text SMS messages is occurring.

If a device has been compromised by the installation of covert monitoring or control software, the collected monitoring results, or other desired information present on the device, must be sent without detection by the device user (covertly exfiltrated). One method of covertly exfiltrating collected monitoring results is by way of SMS messages. An ability to detect, monitor, block, or limit SMS messages being sent from a device can remove this exfiltration pathway from the available methods that can be used by such software, and improve the security of wireless mobile devices and the data that passes through them. Current methods for preventing SMS use for covertly exfiltrating data lack flexibility and can be subverted or bypassed. Methods are needed which are flexible and which at least detect SMS messages in those cases where they can't monitor and/or control them.

Still other risks from unrestricted SMS use exist. For instance, SMS messages can be used to trigger applications installed on a device into responding to the SMS message. This response can include location information concerning the cell or cells that the device is currently located in. Such location information can be useful for locating the device user for purposes of tracking, kidnapping, or harming the device user. When devices include GPS receivers, SIM card interactions can result in the GPS-derived location information being sent to unauthorized recipients, making the current location of the device, and therefore its user, known to a very precise degree. In some situations the device location can be determined to within a 30-foot radius. Some means of limiting or preventing such location information being disclosed inappropriately are needed, while not interfering with desirable sharing of location information or use of GPS receiver hardware for navigation or other purposes, such as location of nearby businesses or services.

Two other commonly used SMS message types are WAP Push Service Load (SL) and WAP Push Service Indication (SI) messages. SI messages are used to notify the device user that new WAP content is available. SL messages cause the device's browser to load the referenced content, optionally without user intervention on some devices. Other devices, such as those running the Symbian OS, require user interaction. SL message actions can be limited based on the security level settings of the device in some cases. Unrestricted and unmonitored WAP Push messages can pose a serious risk to the security of a wireless device when combined with an unaware user who follows a pushed link to a hostile web service, or with browser flaws that permit hostile web services to exploit the wireless device without user interaction or awareness. Some means of monitoring, limiting, or at least detecting SL and SI messages is required.

Another form of SMS message is the SIM Application Toolkit (STK) message. STK messages allows access to the SIM to use or alter the services supported by the device, and to download new services using OTA methods. For example, network operators can remotely provision a wireless device by sending text and/or binary commands and/or binary data embedded in SMS messages. Unlike a typical device application program, the STK executes on the SIM card, not in the device processor(s). STK messages on some devices are not processed at all by the handset, other than to recognize that they are STK messages, and such messages are passed into the SIM card and processed there. Applications that deal with SMS messages on the handset through OS-provided APIs may not have access to STK messages as they typically are not placed into the SMS "inbox" by the wireless device. Such applications are blind to STK messages, and can not block, control, log or do anything else to detect or prevent harm from them. Since the STK comprises functions that can cause the handset to perform potentially harmful actions, such as sending confidential or classified data in SMS Simple Text messages or establishing voice communication between the handset and a remote device, some means of detecting, monitoring, limiting or blocking STK messages is needed.

Within the STK specification, SMS is a key mechanism for personalizing the SIM in each device. The STK has been fully ratified as part of the GSM standard and is incorporated into several manufacturers' devices, both those intended for use on GSM phone networks, and others. The STK has been incorporated into several commercial and trial network services, from mobile banking to information services and email. Given the sensitivity of the information involved, and the potential for altering the device's basic settings, without user awareness in some cases, unrestricted and unmonitored STK messages are a risk to the security of wireless devices that support them, and to the data integrity and confidentiality of the information stored or passing through them. Some means of monitoring, limiting, or at least detecting such messages is required. This requirement exists whether the SMS messages are received over the GSM command channel, an equivalent SMS mechanism in a non-GSM system, such as CDMA, or a different type of communication channel, such as TCP/IP over WiFi or another transport, such as Bluetooth, or by other means, such as IRdA, USB, or Ethernet.

Some network providers (e.g. Verizon Wireless, T-Mobile and AT&T) include filtering of SMS messages as part of their service or security infrastructure. In some cases this filtering involves suppression of "spam" text messages, and/or allow/deny listing for a particular device of particular sender numbers specified by a user of the device. In some cases the SMS filtering goes farther, and suppresses relaying of messages having types that are potentially harmful, such as messages that can be used to change the provisioning of a device, messages that can be used to find the location of a device, and messages that invoke STK functions. Such filtering and suppression of harmful messages is worthwhile, but since it is done in the provider's infrastructure servers, such as an SMSC, there is no protection offered for devices that receive SMS messages by other pathways. For instance, a transmitter in the vicinity of a wireless device could broadcast a signal that overrides that of a local cell tower, and masquerades as that cell tower. The wireless device, not being able to tell the difference between the actual cell tower and the transmitter acting as the local cell tower, will accept SMS messages as coming from the provider's systems, and process them normally. If the masquerading transmitter sends SMS messages that alter provisioning, install software, access files, or other improper actions, these will succeed when the wireless device is relying on the provider's systems to provide security. In a more common scenario, when the mobile device user leaves his home area and is "roaming", the mobile device will be connecting to a different provider network, which may or may not provide SMS filtering or blocking similar to that of the user's own network provider. The mobile device thus becomes vulnerable when it roams to any provider network that doesn't provide SMS filtering and blocking services. A method for the wireless device to provide its own filtering and blocking functions for improper messages is needed.

Some wireless device OSs provide mechanisms to permit the an application to easily become part of the SMS message processing flow, while others do not. For example, the Microsoft Mobile OS provides an Application Programming Interface (API) that permits capture of certain types of SMS message. One problem with relying on such mechanisms for intercepting SMS message traffic is that other applications can also make use of them, and can interfere with the proper operation of the intercepting application, such as by gaining access to SMS messages prior to their being processed by the intercepting application. In addition, such APIs do not typically permit the required operations to be carried out on all SMS message types, or do not ensure that the SMS messages will not have effects on the device even if they are available through the API. APIs can also limit what effects an application can have on an SMS message, such as not supporting modification of SMS messages prior to any other process gaining access to them. For these and other reasons, an intercepting application can not rely on such APIs, and must use other means to ensure interception of all SMS messages prior to their resulting in unwanted effects on the device or the information it contains.

There are some on-device SMS filtering systems in the prior art, such as MCleaner (Beijing Mobile Security Technology Co. Ltd, China), and Kaspersky Anti-Virus Mobile Enterprise Edition (Kaspersky Lab, Woburn, Mass.), but these have some limitations that keep them from providing all of the security capabilities needed to address the risks described herein. For example, a well known limitation is that these applications do not intercept all SMS message types because they access messages using the "inbox", typically through an OS-provided API. They typically provide allow/deny filtering by sender number, but little else. Some include filtering by matching text against the message content. Most only filter incoming messages, and do not limit what is sent from the mobile device (outgoing messages), rendering them useless for purposes of monitoring SMS communication for policy, legal or regulatory compliance purposes. By limiting filtering and blocking to short text messages, they leave the mobile device open to messages that change configuration settings or installed software. In addition, existing SMS on-device "firewalls" typically intercept messages after they are placed in the "in box" on the mobile device, and can not guarantee that the message has not already been processed by other on-device software, such as the OS, other user level applications, or the STK, thus the message might already have had an effect on the device before these prior art systems take any actions. A message might even have been processed and deleted without being seen by these programs. To be truly effective in protecting the mobile device from unwanted SMS messages, or for monitoring and/or limiting SMS message use for exchange of information, SMS messages must be intercepted as early in the process of receiving them on the mobile device as possible, within the constraints created by the mobile device hardware and OS designs.

Thus a need exists to provide methods, software, systems, and devices that better protect SMS messaging, particularly those messages that cause a mobile device's configuration to be changed without a user's knowledge or permission, and this protection needs to be provided in the mobile device, not just on provider infrastructure systems. Additionally, there is a need for preventing the use of wireless mobile device SMS capabilities for unwanted purposes, such as disclosing confidential information, or the installation of software for covert monitoring or control of a mobile device's operation or improper disclosure of the device location, while allowing the device to remain normally functional. The exemplary illustrative technology herein addresses these and other important needs.

4 SUMMARY OF THE INVENTION

The present invention provides systems, methods, and software that provide improved protection for SMS messaging, particularly those messages that cause a mobile device's configuration to be changed without a user's knowledge or permission. The systems, methods and software described herein work on the mobile device in contrast to the prior art's focus on protecting infrastructure systems. In addition, the systems, methods, and software provided herein prevent the use of wireless mobile device SMS capabilities for unwanted purposes.

In a first aspect, the present invention provides a wireless mobile electronic communications device. In one embodiment, the wireless electronic device provided by the invention includes an electronic apparatus configured to send and receive signals using a GSM protocol. The device further includes a subscriber identity module ("SIM") device, which includes electronic hardware and computer software executed by the electronic hardware such that the SIM is configured process messages using a Short Message System ("SMS") between the wireless mobile electronic communications device and a communications network. The device of the invention also includes electronic hardware and computer software executed by the electronic hardware effective to provide a firewall on the wireless mobile electronic communications device, the firewall configured to identify and optionally mediate substantially all infrastructure SMS messages.

In a more specific embodiment, the firewall is configured to identify and optionally mediate substantially all "type 0" SMS messages.

In another more specific embodiment, the firewall is embedded into the operating system of the wireless mobile communications device. In a still more specific embodiments, the firewall is a design feature of the operating system. In an alternative embodiment, the firewall is a modification of the operating system of the wireless mobile communications device. In still another more specific embodiment, the firewall is separate from the operating system of the wireless mobile communications device. In yet another more specific embodiment, the firewall is an application instantiated on the wireless mobile communications device.

In another more specific embodiment, the firewall is a component of the SMS message processing scheme of the wireless mobile communications device. In still other more specific embodiments, the firewall mediates substantially all infrastructure SMS messages sent between the SIM card and the electronic apparatus, and in still more particular embodiments the firewall mediates substantially all "type 0" messages sent between the SIM and the electronic apparatus.

In another aspect, the present invention provides methods for mediating SMS messages in a wireless mobile communications device that is configured to send and receive data using a GSM protocol and including a subscriber identity module ("SIM") that includes electronic hardware and computer software executed by the hardware such that the SIM is configured process messages using a Short Message System ("SMS") between the wireless mobile communications device and a communications network. In one embodiment, the methods provided herein include configuring electronic hardware on the wireless mobile communications device to implement a firewall on the wireless mobile communications device, the firewall configured to identify and optionally mediate infrastructure SMS messages.

In more specific embodiments, the configuring comprises providing the wireless mobile communications device with computer software configured to enable the hardware to implement the firewall. In more specific embodiments, the providing computer software comprises providing an operating system including the software for the wireless mobile communications device. In still more specific embodiments, the providing computer software comprises modifying the operating system of the wireless mobile communications device to include the software.

In other embodiments, the providing computer software comprises providing a software application configured to implement the firewall on the wireless mobile communications device. In still other embodiments, the infrastructure messages are "type 0" SMS messages. Still more specific embodiments include those in which further comprise mediating the infrastructure SMS messages sent between the SIM device and the electronic apparatus.

In still other embodiment, the method of the invention further include mediating the infrastructure SMS messages sent between the SIM device and the electronic apparatus.

In a third aspect, the present invention provides a computer-readable medium containing computer-readable program code devices thereon. The computer-readable program code devices are configured for execution on computer hardware of a wireless mobile communications device, that is configured to send and receive data using a GSM protocol and includes a subscriber identity module ("SIM") includes electronic hardware and computer software executed by the hardware such that the SIM is configured to process messages using a Short Message System ("SMS") between the wireless mobile communications device and a communications network. In one embodiment, the computer-readable programmed code devices comprise computer instructions for configuring the wireless mobile communications device to implement a firewall on the wireless mobile communications device, the firewall configured to identify and optionally mediate infrastructure SMS messages. In a more specific embodiment, the computer-readable program code devices further comprise computer instructions for configuring the wireless mobile communications device to identify and optionally mediate "type 0" SMS messages.

5 BRIEF DESCRIPTION OF THE DRAWINGS

6 DESCRIPTION OF SOME EXEMPLARY, NON-LIMITING IMPLEMENTATIONS

6.1 Overview

Figure 1:
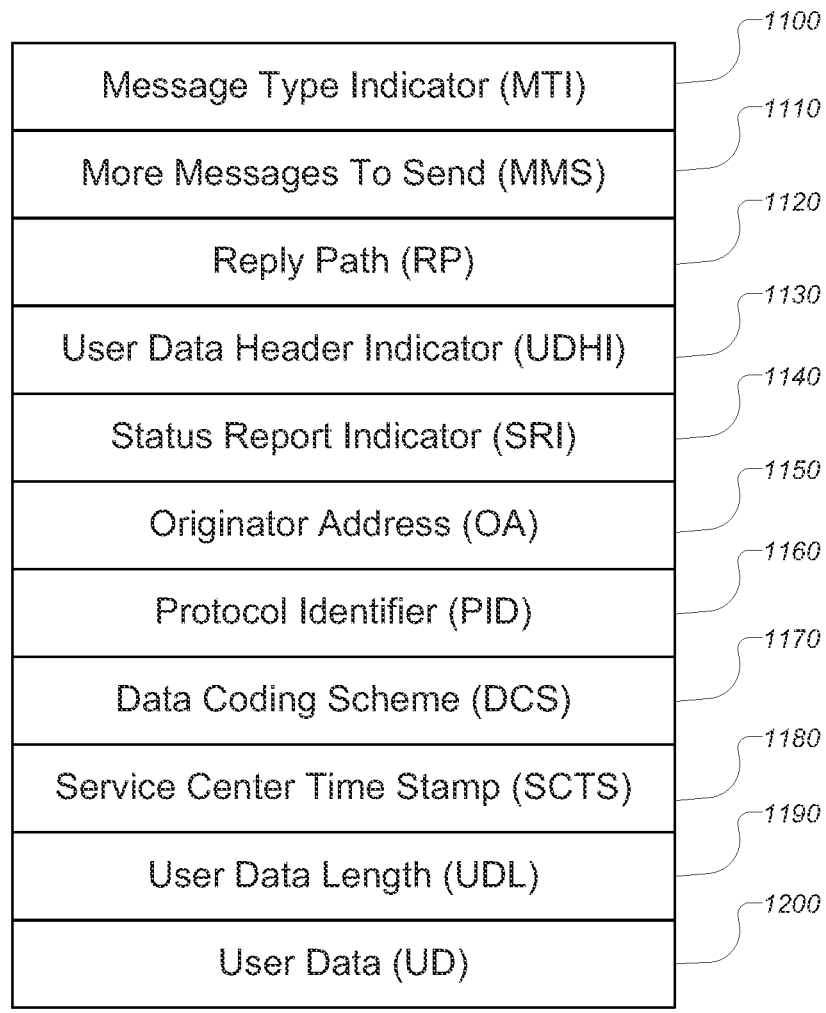
FIG. 1 depicts the data fields contained in an SMS-DELIVER message, including optional fields, as known in the prior art.
Figure 2:
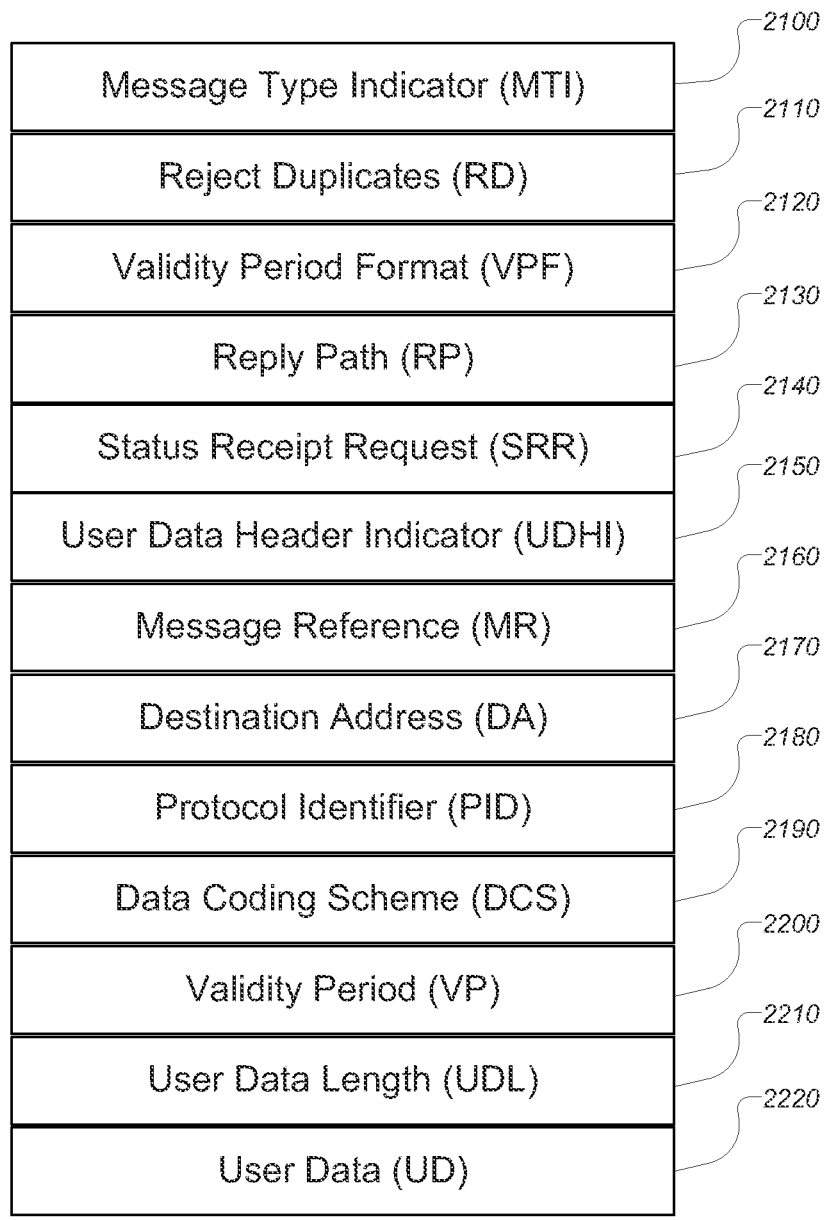
FIG. 2 depicts the data fields contained in an SMS-SUBMIT message, including optional fields, as known in the prior art.
Figure 3:
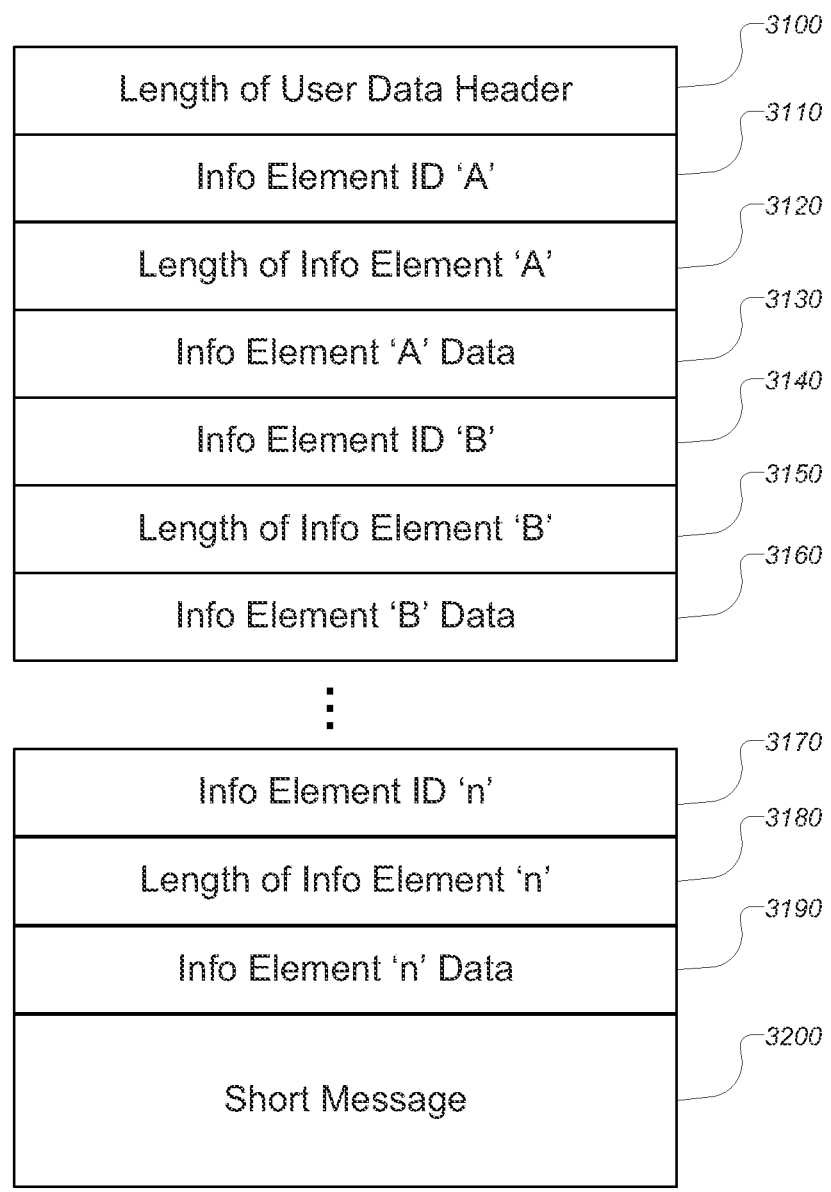
FIG. 3 depicts the data fields contained in the User Data (UD) field of an SMS-DELIVER or SMS-SUBMIT message, including an optional User Data Header section, as known in the prior art.

The current exemplary illustrative non-limiting implementation of the technology herein provides systems, methods, procedures, processes, apparatus, and techniques that enable monitoring, identification, limiting, and, in some cases, blocking of SMS message traffic to and from wireless mobile devices. Typically, SMS messages are detected and monitored, and most forms can be limited or blocked at the SMSC; but an effective means of detecting, monitoring, blocking, or otherwise limiting the effects of received messages, and the proactive reversal of unblockable messages, can only be performed at the mobile device itself. Message can have their effects (such as configuration changes or software installations) partially or completely reversed, thus achieving the logical equivalent of limitation or blockage without actually blocking or limiting those message types. The above-described capabilities constitute an "SMS Firewall" with respect to SMS messages received at the wireless device as provided by the present invention. Those having ordinary skill in the art will appreciate that while an SMS Firewall provided by the invention may have certain superficial similarities to a traditional TCP/IP firewall, the SMS Firewall's functions are significantly different and involve significant technical challenges that are different from those of TCP/IP-based firewalls, as will be apparent to those having ordinary skill in the art upon reading the disclosure herein.

The term "SMS message", as used herein, refers to mobile-originated and mobile-terminated short messages as described by the 3rd Generation Partnership Project (of Valbonne, France, http://www.3gpp.org) "Technical realization of the Short Message Service (SMS)" document 3GPP TS 23.040, or prior versions (e.g. 3GPP TS 03.40), equivalents, or descendents, thereof. SMS mobile originated messages are sent from a mobile device to a Short Message Service Center (SMSC). SMS mobile terminated messages are typically sent from an SMSC to a mobile device. Communication between an SMSC and a mobile device are typically performed using the control channel that is also used to arrange call setup for voice calls, provide location information for cell selection and other uses, but can make use of other communication pathways, such as 3G networks, or TCP/IP packets over WiFi local wireless connections. While SMS messaging originated with GSM networks, similar capabilities have been implemented on other networks, such as Code Division Multiple Access (CDMA, used by Sprint PCS of Overland Park, Kans., and Verizon Wireless of Basking Ridge, N.J.) and Time Division Multiple Access (TDMS, used by AT&T Mobility of Atlanta, Ga.) networks. SMS messages can also be originated using other protocols and sent through gateways that convert the other protocols to SMS messages, or originated as SMS messages and sent through gateways that convert the SMS messages to other protocols. Examples of such gateways include e-mail to SMS, web site generated SMS messages, and text-to-speech conversion systems.

The term "mediate" or "mediation" is used herein to refer to the monitoring, limiting, reversing effects of, (e.g. returning configuration changes made as a result of a message to their prior settings, uninstalling software installed as a result of a message, etc.), and blocking of SMS messages sent to a mobile device (SMS mobile terminated messages) or from a mobile device (SMS mobile originated messages). In some exemplary embodiments, mediation performed in accordance with the present invention as described herein prevents improper access to the device The actions required to implement mediation can be performed with, or without, the device user's assistance or knowledge. Similarly, in other embodiments, SMS messages being sent from the device are mediated in order to prevent, or to detect and log, improper disclosure of information or other unauthorized communication. Such mediation may be required by security regulations for military or government agencies, by regulatory requirements on certain businesses or by professional practices (e.g. the Health Insurance Portability and Accountability Act (HIPAA) for medical records), to prevent improper disclosure of organizational data, such as plans, accounts, or confidential reports, or identity theft through the improper disclosure of personal information or the misuse of a wireless device; for instance, to improperly authorize online or other purchases. In some cases, there can be a legal requirement to monitor and log certain kinds of communication, whether being sent to the device or from the device, for future reference by auditors or government agencies, such as the record requirements of the Sarbanes-Oxley Act. In these scenarios, an SMS Firewall embodiment is able to resist unauthorized disablement or bypassing by the mobile device user, by other device software, by OTA messages, and by entities or systems external to the device so as to ensure that the mediation and other capabilities of the SMS Firewall remain operable. Where resistance to disablement is not possible, some embodiments of the SMS Firewall are constructed and installed such that disabling the firewall prevents SMS transmission or reception by the device. Some embodiments also comprise an ability to detect when the SMS Firewall is disabled, and some of these comprise systems for re-enabling the SMS Firewall automatically.

To ensure that all SMS messages are mediated, preferably before they have an adverse effect on the device, its configuration or the information it contains, the SMS Firewall can not rely on an application-level API to access SMS messages after they are received (e.g. the Microsoft (Redmond, Wash.) Short Message Service (SMS) API). Such APIs typically limit access to incoming or outgoing SMS messages by supporting only a subset of possible SMS message types, or only those types handled by the handset, with SMS message types destined for the SIM not being available through such APIs. Application-level APIs also typically do not guarantee interception by a first application prior to processing by a second application. This does not ensure mediation of all SMS message types, or mediation prior to processing by device applications. For example, an SMS Type 0 message, sometimes referred to as a "flash" SMS, is processed, potentially updates the device display, and can then be discarded without being made available through an application-level API. In another example, a SIM Data download SMS message is typically received by the device OS and handed off to the SIM for processing, and is not made available to handset applications through the SMS application-level API. The SMS Firewall must intercept all SMS message traffic at a lower level, as close to the point where the message is received by the device hardware as possible. To accomplish this, the SMS Firewall is embedded into the device operating system processing flow by the design of the OS, by modifications to the OS installation by the SMS Firewall or its associated software, such as an installer, as described below, or by other means as will be apparent to those with skill in the art.

Figure 4:
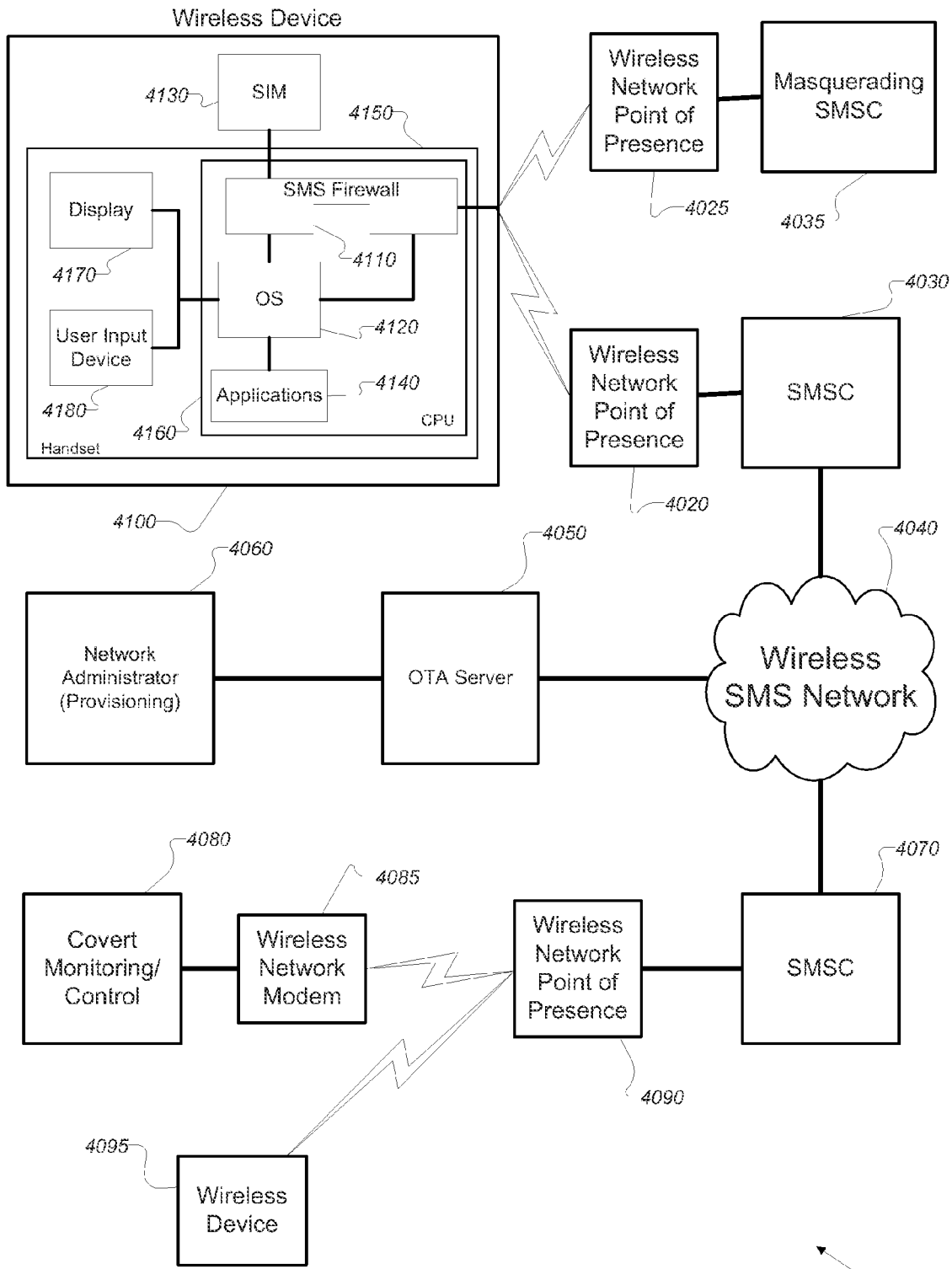
FIG. 4 is a schematic diagram of an exemplary Wireless SMS network, showing the major components as they relate to the exemplary technology herein in accordance with one embodiment of the invention.

The relationship between the SMS Firewall and other relevant components of an SMS message system (4000) is depicted in FIG. 4. The SMS Firewall (4110), is a component of an electronic apparatus that is configured to send and receive signals, more particularly signals encoded using the GSM protocol. In the exemplary embodiment depicted, the SMS Firewall executes on a Wireless Device's (4100) handset's (4150) CPU (4160), and is logically located between a Wireless Device's (4100) Operating System (OS) (4120) and the wireless network point-of-presence (4020) that connects the Wireless Device (4100) to the Short Message Service Center (SMSC) (4030). This location protects the Wireless Device (4100) from all SMS message traffic, regardless of whether it originates at a Network Administrator (4060) working through an OTA Provisioning Server (4050), that connects to the SMSC (4030) through a wireless Data Network (4040) (such as GSM or CDMA), or from another wireless device (4095) or covert monitoring device (4080) using a wireless network modem (4085) to connect through a wireless network point-of-presence (4090) and SMSC (4070). The device is also protected from local transmitters masquerading as network provider wireless network points-of-presence (4025) and SMSCs (4035) so as to bypass any SMS message content restrictions being enforced by the network provider. A typical Wireless Device (4100) handset component (4150) also typically comprises at least one informational display (4170), such as an LCD screen, LED display, light, etc., and at least one type of user input device (4180), such as a keypad, touchscreen, trackball, etc. The handset (4150) also typically comprises a microphone, speaker, sensors (motion, GPS, etc.), radios, batteries and other components (not shown), as will be well understood by those with ordinary skill in the art.

In some embodiments, the SMS Firewall (4110) is implemented, at least in part, as an application instantiated on the wireless device it protects (4100) and thus comprises a barrier to SMS messages between the protected wireless device and other devices or systems. The SMS Firewall of the present invention identifies and optionally mediates substantially all infrastructure SMS messages, particularly infrastructure SMS messages between the SIM card (4130) and the mobile device handset (4150) components of the Wireless Device (4100). In more specific embodiments, the infrastructure SMS messages are type 0 SMS messages. Alternatively, the SMS Firewall (4110) is implemented as part of the wireless device operating system (OS) (4120) software. In yet other alternative embodiments, the SMS Firewall (4110) is provided in the SIM card (4130) installed in the wireless device (4100). Regardless of the specific method of implementation, the SMS Firewall (4110) functionally adds itself into the wireless device's (4100) SMS message processing scheme and becomes a part of it. In some exemplary systems, the SMS Firewall (4100) also mediates messages sent between processes running on the mobile device (4140), whether they are running on the mobile device handset (4150), or communicating between the SIM card (4130) and mobile device handset (4150) components.

In some embodiments the SMS Firewall identifies and optionally mediates all SMS messages, regardless of message type. For example, the SMS Firewall can intercept and identify SIM Data download messages as they arrive, and before they are passed on to the SIM card, thus mediating such messages. In some alternative embodiments the SMS Firewall is implemented at least partially within the SIM card in such a manner as to permit mediation of SMS messages on the SIM card before other aspects of the SIM card can process them. This is in contrast with prior art on-device SMS filtering applications that only deal with a subset of possible SMS message types, such as Simple Text SMS messages, usually for "spam" reduction or to block messages from specific senders.

Without being bound to any particular theory of operation, those having ordinary skill in the art will appreciate that unlike a typical Internet protocol (ICMP, TCP/IP, etc.) firewall, which deals with packets primarily based on address data, and secondarily and optionally, dealing with session data through mechanisms such as Network Address Translation (NAT), the SMS Firewall primarily deals with message data, such as the SMS Message type (text, WAP push, etc.), or message content. Sender information, such as the originating phone number, can be used to further categorize SMS messages; however, SMS message information, such as an SMS message type, is an indicator of how an SMS message is treated by the SMS Firewall. In short, Internet (e.g., TCP/IP-based) firewalls are primarily concerned with "who" is being let through and only tangentially are concerned with the contents of the communication; the SMS Firewalls provided by the invention are concerned with the types of messages that are allowed to pass through and their effects on the mobile device. Moreover, the SMS Firewall of the current invention mediates intra-device communication, such as between the SIM card and the mobile device handset, while Internet firewalls are typically concerned only with external, inter-device communication.

In one embodiment, the SMS Firewall is deployed OTA as a downloaded application. In more specific embodiments the SMS Firewall is deployed covertly. In other specific embodiments, the SMS Firewall is deployed overtly. In still other embodiments, the SMS Firewall is included with the device by its manufacturer. In still other embodiments, the SMS Firewall is deployed through a wired connection, a peer-to-peer wireless connection such as Bluetooth, or by any other means of installing application software useful to the wireless mobile device as will be known to those having skill in the art. In some exemplary implementations, the SMS Firewall is deployed as a SIM application within the wireless mobile device's SIM card. In some exemplary implementations where the SMS Firewall is deployed as a SIM application, the SMS Firewall includes an "agent" aspect that is configured to address aspects of SMS Firewall functionality that require a presence on the handset to enable mediation of incoming or outgoing SMS messages, or mediation of SIM/handset internal messaging. In embodiments that deploy the SMS Firewall in a SIM card and that require an "agent" on the handset to implement full SMS Firewall functionality, the agent software can be separately installed on the handset, included in the handset OS, or be installed on the handset by the SMS Firewall portion that is running on the SIM card. In some device types the SMS Firewall portion running on the SIM card must use indirect methods, such as sending SMS messages to the handset or cooperating with an external server system, to cause the agent software to be installed on the mobile device handset. Other aspects of such functionality will be apparent to those having ordinary skill in the art.

Figure 5:
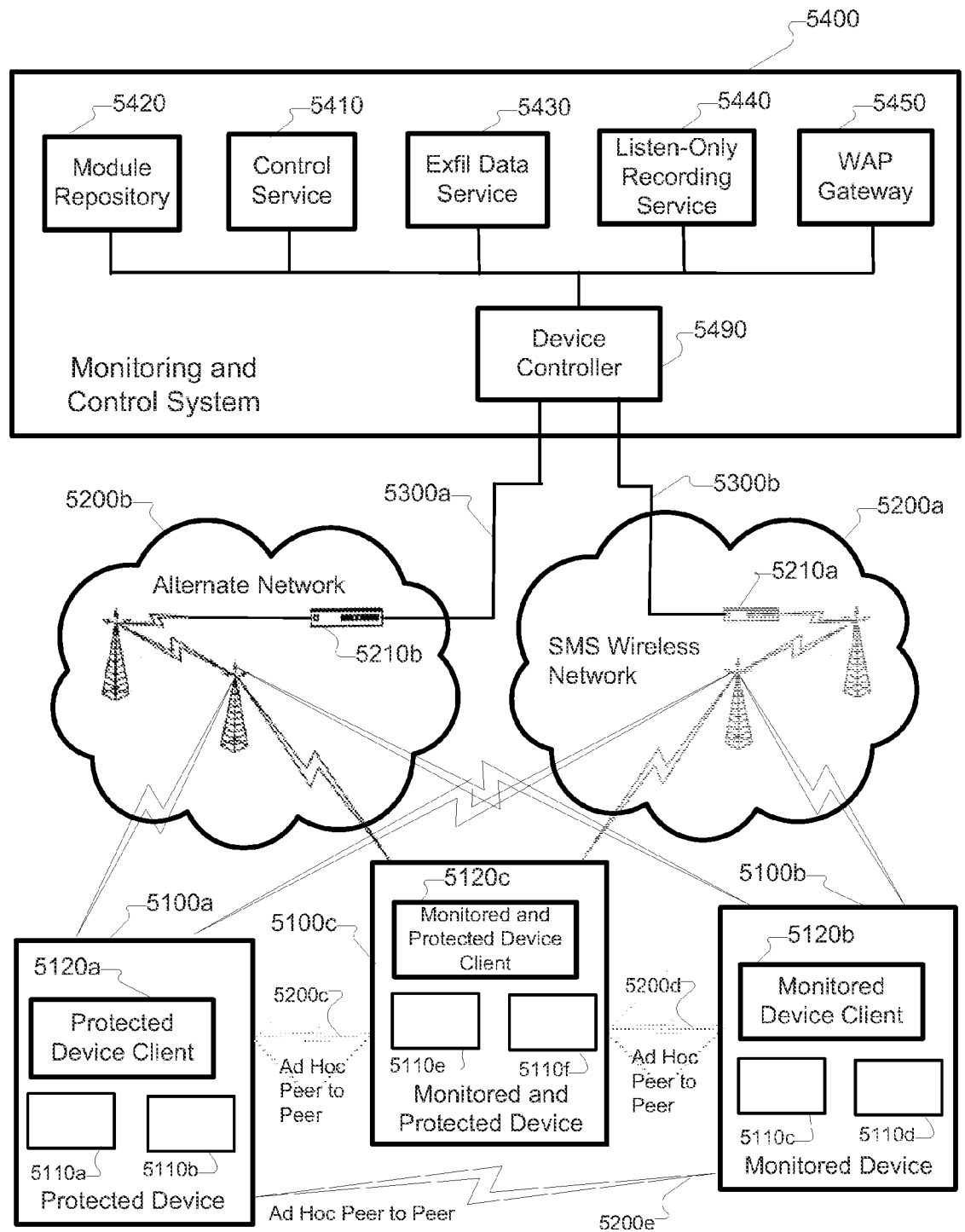
FIG. 5 is a schematic diagram of exemplary wireless networks, showing the major components including the exemplary technology herein in accordance with one embodiment of the invention.

As depicted in FIG. 5, the SMS Firewall of the invention can be installed in a variety of configurations (5120*a*, 5120*b* & 5120*c*) on varioud mobile devices 5100*a*, 5100*b* & 5100*c* that communicate with a Monitoring and Control System (5400). The Monitorng and Control System comprises one or more applications, such as a Module Repository (5420), a Control Service (5410), an Exfiltration Data Service (5430), a Listen-Only Recording Service (5440), and a WAP Gateway (5450) running on one or more servers, and communicating through a Device Controller application (5490) using SMS (5200*a*) or other protocols or networks (5200*b*), such as TCP/IP over Wi-Fi or other connections (e.g. GSM/GPRS EDGE) in devices and locations that support these. The Monitoring and Control System (5400) can be used to configure or re-configure the SMS Firewalls (5120*a*, 5120*b* & 5120*c*) to receive collected data (e.g. logs, debugging or other data sent by the the SMS Firewalls or queried from the device using known SMS message types or other methods such as HTTP or FTP protocol exchanges over a TCP/IP connection), to provide additional software useful for securing the wireless mobile device (5100*a*, 5100*b*, or 5100*c*) from threats detected by use of the SMS Firewall (5120*a*, 5120*b* & 5120*c*), or for other purposes related to SMS Firewall (5120*a*, 5120*b* & 5120*c*) functionality. The Device Controller (5490) can connect to the SMS Wireless Network (5200*a*) through a wired connection (5300*b*) to a wireless network modem (5210*a*) or by other appropriate means as will be clear to those with ordinary skill in the art. The Device Controller (5490) can connect to other wireless networks (5200*b*), when these are used, through a wired connection (5300*a*) to a wireless network modem (5210*b*) or by other appropriate means as will be clear to those with ordinary skill in the art. Each wireless mobile device (5100*a*, 5100*b*, or 5100*c*) can comprise additional components, processes, and parts (5110*a*, 5110*b*, 5110*c*, 5110*d*, 5110*e*, & 5110*f*), such as device operating systems, data storage systems, e-mail and web clients, and/or GPS mapping systems. The provision and implementation of the foregoing operations will be understood by those having ordinary skill in the art.

In addition to the protocols and networks shown in FIG. 5 (5200*a* & 5200*b*) and discussed above, in some exemplary implementations, peer-to-peer (P2P) technologies (5200*c*, 5200*d*, & 5200*e*), such as Bluetooth or IRdA, are used to enable communication between wireless mobile devices or between mobile wireless devices and wired devices, such as network access points, for communication between the SMS Firewall and the Monitoring and Control System.

As indicated in FIG. 5, in some embodiments the SMS Firewall mobile device clients function as protection for the mobile device (as in wireless mobile device 5100*a*), monitor device communication (as in wireless mobile device 5100*b*), or both (as in wireless mobile device 5100*c*). In some exemplary implementations, these three modes of operation are determined by configuration settings in the SMS Firewalls (5120*a*, 5120*b* & 5120*c*). In some embodiments, SMS Firewall's configuration is stored within the SMS Firewall itself. In alternate embodiments, the SMS Firewall's configuration is installed as a separate file or store within the mobile device. In some embodiments, the configurations are unified; alternatively, they are comprised of disparate rules. In some embodiments, the configurations are, in whole or in part, downloaded into a mobile device, both for initial use and for subsequent changes or updates. In other exemplary implementations, the mode of operation is determined by the design of the particular SMS Firewall (5120*a*, 5120*b* & 5120*c*) and the appropriately designed version is selected based on the intended use.

The SMS Firewall in some exemplary implementations, e.g., those intended for covert deployment or involuntary monitoring, runs "silently", without a user interface (UI) and in ways that limit the wireless device user's ability to detect its presence or affect its functioning. In some embodiments, e.g., when monitoring device use to comply with the requirements of the Sarbanes-Oxley Act or otherwise monitor confidential information transfer, the user is prevented from disabling the SMS Firewall or undetected tampering with any data it has logged. In other embodiments, the user is prevented from transmitting data without detection when the user is unable to delete logged data before it is exfiltrated or shut down the SMS Firewall without also shutting down the device to maintain thereby the credibility and utility of the data logged by the SMS Firewall. In some embodiments, when used in a covert or involuntary manner, the configuration and control of the SMS Firewall is completely, or partially, performed through the Monitoring and Control System. In some embodiments, the SMS Firewall functionality that is under the device user's control is determined by configuration settings, or, in other embodiments, by omitting a UI entirely.

In other exemplary implementations where covert or involuntary deployment and operation are not factors, or where the device user is given at least some control over the SMS Firewall functionality, the SMS Firewall provides a user interface that can be used to alert the device user to SMS message traffic. In more specific embodiments the degree of control includes enabling the user to provide input as to how the SMS message traffic is to be dealt with, such as whether to block a WAP Push Service Load message or permit it, whether to record an SMS Simple Text Message for export to a logging server or not, or whether to permit provisioning of a new ringtone or software application or not. In exemplary implementations that lack a UI, such interaction is performed through the monitoring console; in other exemplary implementations it is omitted.

In some embodiments, for both covert and non-covert deployments the configuration of the SMS Firewall specifies the behavior of the SMS Firewall. For example, the configuration settings can specify that WAP Push SL messages are to be blocked, WAP Push SI messages are allowed only when they specify URLs in a particular set of domains (an "allow list", also sometimes referred to as a "whitelist") and otherwise blocked, or allowed unless they specify a URL in a particular set of domains (a "deny list", also sometimes referred to as a "blacklist"), and that the device user is not permitted to alter the allow list or deny list, or turn off WAP Push SL blocking based on either list. In another example, configuration settings specify that Simple Text SMS messages are recorded for exfiltration to a logging server whether being sent from or to the device or that STK messages are allowed (or both), unless they will result in removal or shutdown of the SMS Firewall application, in which case they are blocked or their effects reversed to the extent possible and their receipt logged regardless. In other embodiments, the device user can enable the above-described restrictions as desired.

In still other embodiments, the configuration of the SMS Firewall is altered by the deploying server as required at any time through specially coded SMS messages, or by other means such as commands sent to the SMS Firewall using other networks and protocols, such as TCP/IP over a Wi-Fi or cellular data network connection (e.g. EDGE). In some exemplary implementations, any configuration options and rules for the SMS Firewall are collected into named sets as "behavior profiles". In more specific embodiments, the SMS Firewall stores a plurality of different behavior profiles, and a particular behavior profile designated as "active" specifies the functioning of the SMS Firewall. In still more specific embodiments, the behavior profile designated as "active" at any given time is specified by the Monitoring and Control System by use of an appropriate command to the SMS Firewall, by the SMS Firewall in response to detection of specified conditions, or, in deployments comprising a UI supporting and permitting this, by the device user. Additional detailed embodiments concerning this aspect of the SMS Firewall are described below.

In some exemplary implementations the Monitoring and Control System is used to download additional software to the wireless mobile device by way of the SMS Firewall, or enables the device to query threat databases. In some exemplary implementations, the additional software is selected based on data collected and sent by the SMS Firewall to the Monitoring and Control System. For example, if the SMS Firewall detects a pattern of SMS messages that may constitute an attempt to compromise the device's security (e.g. a pre-determined or computed number of messages that cause a WAP Push Service Load from a deny listed URL, or a message that causes the SIM to issue an AT command to dial a phone number silently), the SMS Firewall can relay data indicating the possible attack to the Monitoring and Control System, where software designed to collect additional data or protect the device from the attempt to compromise it, or both, is selected or created and sent back to the wireless mobile device. In some embodiments, these actions are done automatically; in other embodiments, the actions are performed with human assistance. In another example, receipt of a WAP Push Service Load (SL) message causes the SMS Firewall to contact the Monitoring and Control System to determine if the URI specified in the SL message is on a list of prohibited URIs (a "deny list") or, in other embodiments, if the URI is on a list of specifically permitted URIs (an "allow list") before blocking or permitting the SL message to be processed. This capability permits protection of wireless mobile devices from a wider range of possible abuses than the device might have storage space to support on its own, permits adapting responses as threats change, and can involve expert human assistance as needed for diagnosis and response without a requirement for action, or even awareness, on the part of the device's user.

Those having ordinary skill in the art will understand that the ability to monitor or limit SMS messages received by a device can protect, or help protect, the device from harmful software installation, improper sharing of information stored on the device, improper use of the device, improper disclosure of the device location, and other misuse, whether this is done by covertly loaded software or by use of "Trojan horse" techniques where a device user is induced or tricked into downloading harmful software or fraudulently convinced to reveal confidential data such as by redirecting the user to a web site constructed to simulate a trusted website. Control and monitoring of SMS messages also benefits organizations concerned with protection of confidential information, whether by actually limiting information transmission by blocking data sending completely or partially, or by monitoring transmitted data and thus providing an inhibition against sending data improperly. Such protection of information from improper sharing can support organizational requirements, such as compliance with the Sarbanes-Oxley act, HIPPA, or other laws requiring limitations on information disclosure and/or monitoring and recording of disclosures of particular types of information. By limiting, misdirecting, or preventing device location tracking, the SMS Firewall also can help protect the device user from harm in some scenarios.

6.2 Exemplary System Architecture

Figure 6:
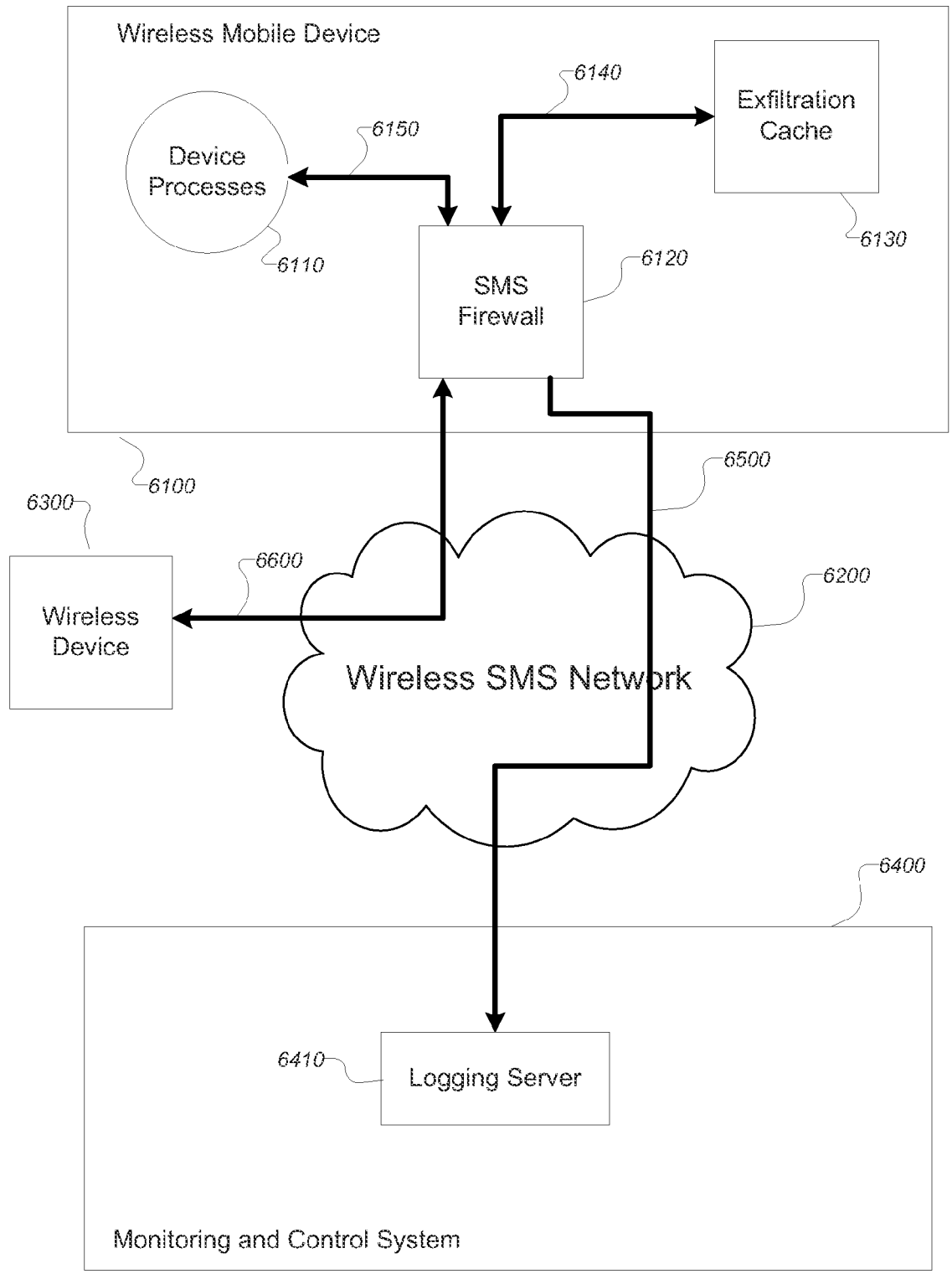
FIG. 6 is a schematic diagram showing the major components of one embodiment of the current invention.

As depicted in FIG. 6, the components involved in implementing an exemplary SMS Firewall on a wireless mobile device include, but are not limited to: a Wireless Mobile Device (6100) (comprising, in addition to the typical components, such as various Device Processes (6110) and other components such as an Operating System (not shown) and User Interface (not shown), an SMS Firewall (6120) and an Exfiltration Cache (6130)), a Monitoring and Control System (6400) (comprising at least a Logging Server (6410)), and a GSM or other suitable network (6200) to permit the Wireless Mobile Device (6100) to receive and send SMS messages (6600) from or to other devices, such as a disparate Wireless Device (6300), and to permit the Wireless Mobile Device to send (6140 & 6500) data collected in the Exfiltration Cache (6130) to the Logging Server (6410). The provision and implementation of these elements will be familiar to those having ordinary skill in the art.

In at least one exemplary embodiment, the SMS Firewall (6120) comprises a plurality of configuration settings. These configuration settings are used by the SMS Firewall (6120) to control specific aspects of functionality during operation. Configuration settings can be default settings, which are provided as part of the SMS Firewall (6120) installation, or they can be dynamic settings, which are altered as required by the device user through a User Interface (UI) in some embodiments, by commands sent from the Monitoring and Control System in some other embodiments, by the SMS Firewall (6120) in response to certain detected events in yet other embodiments, or by any or all of these in still other embodiments. Specific configuration settings can have default values that are used until such time as the setting is altered by UI, Monitoring and Control System or SMS Firewall (6120) action.

Configuration settings can be communicated and/or stored in simple arrangements, such as the "name=value" method used by ".ini" files on some versions of the Windows operating system sold by Microsoft Corporation (Redmond, Wash.), or in more complex formats, such as the standard eXtended Markup Language (XML). In some exemplary embodiments, a plurality of methods are used for communicating and storing configuration information. For example, one possible exemplary embodiment uses XML to format configuration information for transmission between the Monitoring and Control System and the SMS Firewall on the mobile device, but stores the settings in a relational database on the mobile device and in the Monitoring and Control System. Configuration settings can be stored in the mobile device memory, in files on the device, by altering specific portions of the SMS Firewall (6120) itself, or in any other manner as determined to be proper by those with skill in the art. A non-limiting, exemplary list of some possible configuration settings comprises:

- SMS Text Message Block—if set, SMS Short Text Messages are blocked.
- SMS Text Message Send Block—if set, sending of SMS Short Text Messages are blocked.
- SMS Text Message Receive Block—if set, reception of SMS Short Text Messages are blocked.
- SMS Message Logging—specify whether to log SMS messages, and which messages should be logged (i.e. all, incoming, outgoing, containing keywords, to or from specific numbers, etc.)
- SIM Tool Kit confirm—periodically check that the SIM Tool Kit is enabled, and re-enable if not.
- Data connection confirm—periodically check that data connections are possible, and re-enable if not.
- WAP Push Block—Allow or Deny WAP Push SMS messages
- WAP Push Allow/Deny List—Specify permitted/blocked WAP Push URLs
- Enable GPS—If set, override SMS Firewall default that disables GPS.
- Enable Bluetooth—If set, override SMS Firewall default that disables Bluetooth use.
- Set Bluetooth to visible to all—If set, override SMS Firewall default that would hide Bluetooth.
- UI Enabled—If set, the user interface (UI) is enabled, otherwise the SMS Firewall operates covertly.

In some embodiments, the SMS messages sent from disparate devices (6600) must traverse the SMS Firewall (6130) before they are passed (6150) to any of the Device Processes (6110) on the Wireless Mobile Device (6100) that would normally deal with them. In more detailed embodiments, the SMS Firewall (6130) records the SMS Messages it processes, whether these are blocked or not and regardless of the type of SMS message being processed, in the Exfiltration Cache (6130) for later sending (6500) to the Logging Server (6410) where they are stored, displayed, or otherwise processed, recorded, or forwarded as required. The provision and implementation of these elements will be familiar to those having ordinary skill in the art.

Continuing with FIG. 6, in exemplary implementations, data accumulated in the Exfiltration Cache (6130) can be sent to the Logging Server (6410) on a specified or computed periodic basis, when cache resources are reduced to a specified or computed level, or when the Logging Server (6410) requests transmission, as determined by the design of the exemplary implementation and its configuration. When exfiltrating data, all cached data can be sent, or a subset of the cached data, selected by various means, such as SMS message type, date, most or least recent, the action taken on the device, or a text match, or partial match, or a match with a specified pattern (e.g., a pattern specified with a "regular expression", or "regex", as is widely used in the software industry for specifying search patterns in text editors such as Emacs or utility commands such as the Unix "grep" command) with the contents of stored SMS messages. These actions can be implemented by persons having ordinary skill in the art.

In some exemplary embodiments of the current invention, data in the Exfiltration Cache (6130) is protected against tampering or loss. Methods of preventing deletion or alteration of cached data include, but are not limited to, encryption to prevent viewing or editing of the data, inclusion of regular time-stamps to detect deletion of portions of the data, and hiding the data through means such as placing the data in files having names similar to other files normally found on the device, appending the data to existing and expected files, placing the data in files that are not listed in a normal file directory, alteration of the device OS file access functions to block access to the cache files, or any combination of these or other methods that will be well understood by those having skill in the art. The method chosen will depend to some extent on the design of the mobile device in question, and will vary from one device to another.

Data can be sent as SMS messages, or using any other method supported by the wireless mobile device (6100) and the Logging Server (6410), such as a TCP/IP connection over a Wi-Fi link or other connection means, using a sync cradle and wired connection, over a Peer-to-Peer connection, such as Bluetooth, or by removal of the Wireless Mobile Device's storage components and connecting them to the Logging Server for extraction of the cached data. When the exfiltration must be done covertly, some methods are inappropriate, and other methods can require care in their employment to prevent detection using methods known to those with skill in the art. For example, U.S. patent application Ser. No. 12/209,874, incorporated herein in its entirety and for all purposes, describes several methods by which data can be covertly exfiltrated from wireless mobile devices. These actions can be implemented by persons having ordinary skill in the art.

Figure 7A:
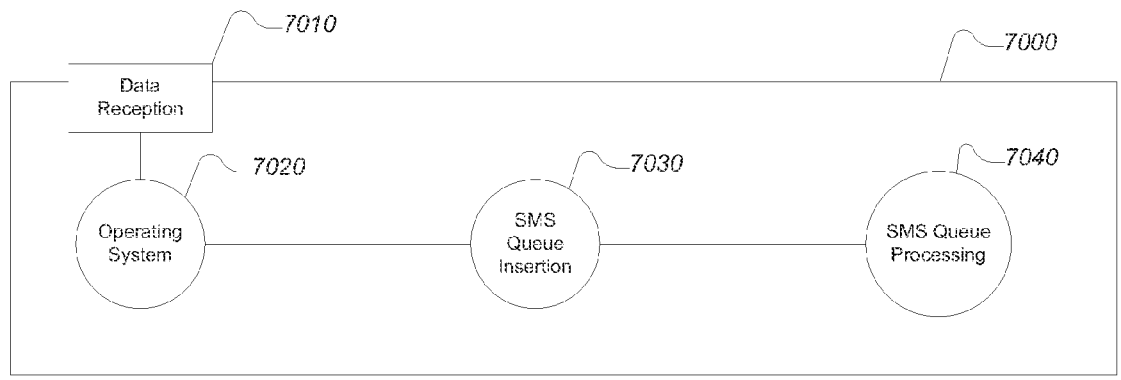
FIGS. 7a, 7b, 7c and 7d depict four schematic diagrams showing the components involved in reception and processing of SMS messages, and how an SMS Firewall can be inserted at various points in this processing in accordance with one embodiment of the invention.

A schematic diagram illustrating one embodiment of SMS message reception and processing flow for a wireless mobile device (7000) and three exemplary methods for inserting an SMS Firewall into the SMS message reception and processing flow of a typical wireless mobile device (7100, 7200, 7300) are depicted in FIGS. 7*a*, 7*b*, 7*c* and 7*d* respectively. FIG. 7*a* (7000), illustrates an SMS message processing flow comprising Data Reception (7010), distribution of received data by the Operating System (7020) to an SMS Queue Insertion mechanism (7030), and processing of SMS Queue entries by one or more SMS Queue processing mechanisms (7040). The provision and implementation of these elements will be familiar to those having ordinary skill in the art. It should be noted that the use of "SMS Queue" to refer to the structure or structures used to handle an SMS message during processing is not meant to imply a particular architecture for any specific implementation. Exemplary devices can use one or more queues, one or more stacks, or any other appropriate structure as determined by those with skill in the art, or any combination of these without exceeding the scope of what is meant by "SMS Queue" herein, which is simply an arrangement whereby SMS messages can be maintained in forms and relationships suitable for their processing.

In some embodiments, Data Reception (7010) involves receiving the radio frequency (RF) signal from a wireless point-of-presence, such as a cell tower, converting it into digital data, and handling any protocol requirements, such as handshaking, removal of transmission headers, error checking, and other actions well known to those with skill in the art. Received data comprising SMS messages are routed by the Operating System (7020), or supporting systems employed by it, such as device drivers, library routines, or special purpose hardware, to the SMS Queue Insertion mechanism (7030). The provision and implementation of these elements will be familiar to those having ordinary skill in the art.

In some embodiments, the SMS Queue Insertion mechanism (7030) places the received SMS message data into a data repository, such as an SMS message queue, a set of SMS message queues, a database of received messages, or other appropriate structure where they can be accessed and acted upon by the SMS Queue Processing mechanism (7040). The provision and implementation of these elements will be familiar to those having ordinary skill in the art.

In some embodiments, the SMS Queue Processing mechanism (7040) processes SMS messages in a variety of ways, depending on the message type and content. For example, in some embodiments, SMS Simple Text messages are displayed for the user to read, and perceptible signal, such as an audible beep or a blinking light, is activated to alert the user to the availability of a Simple Text message for reading, or a WAP Push Service Load message causes the device's browser to access a specified URI. The provision and implementation of these elements will be familiar to those having ordinary skill in the art.

Figure 7B:
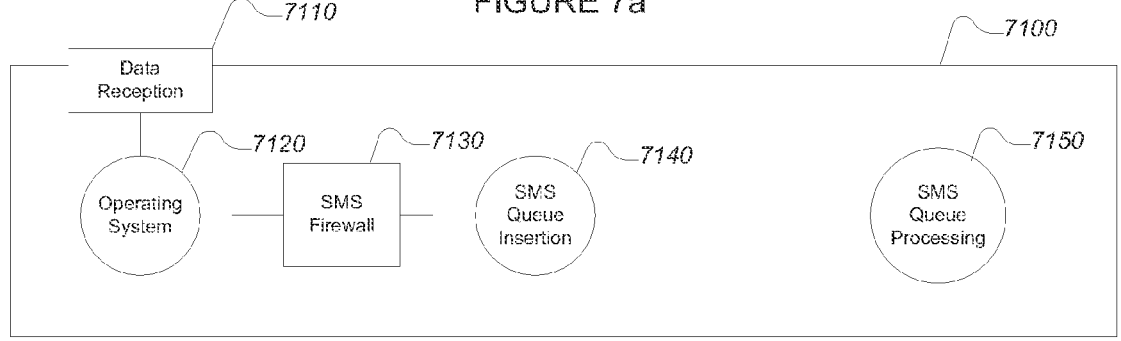

In some embodiments, such as the one depicted in FIG. 7b, the insertion of the SMS Firewall (7130) into the SMS message reception and processing flow is accomplished by a variety of means, the selection of which depending on the design of the device and the device operating system (7120). In some exemplary implementations, the operating system (7120) employs a loadable device driver, comprising a set of software instructions implementing a method of responding to data being made available by the Data Reception hardware (7110) by transferring such data from the receiving hardware to a data storage structure, such as an input queue, or to a destination specified by a device process, such as the SMS Queue Insertion process (7140) that has control of the input hardware, or has otherwise requested delivery of data arriving through it. Such mechanisms are well known to those having skill in the art. In exemplary implementations that use loadable device drivers, the SMS Firewall is inserted into the processing flow by constructing it to replace such loadable device drivers, and installing the SMS Firewall on the wireless mobile device as the loadable device driver to be used for SMS data reception. In such exemplary implementations, the device operating system loads the SMS Firewall as the device driver for SMS data reception, and the SMS Firewall has access to all SMS data received by the wireless device prior to any other device software and can perform its functions. In some exemplary implementations the SMS Firewall can be implemented in two or more parts, one or more of which function as loadable device drivers, and the remainder of which work in conjunction with the parts that do act as loadable device drivers. In such implementations the part or parts functioning as loadable device drivers are responsible for diverting SMS data to the remaining parts of the SMS Firewall, and, in some exemplary implementations, accepting back those data that are passed, whether modified or not modified by the SMS Firewall, for normal routing to the SMS Queue Insertion mechanism (7140) or other processes. In some cases data are not passed back, such as when a message is being blocked. The non-loadable device driver parts are responsible for the remainder of the SMS Firewall functionality. Provision and implementation of these elements will be familiar to those having ordinary skill in the art.

In other exemplary implementations, the device software is adapted to the requirements of the particular hardware using dynamically loadable libraries (DLLs), such as, for example, the MOBILE WINDOWS OS's Radio Interface Layer (RIL) DLL. As is familiar to those having ordinary skill in the art, a dynamically loadable library is a collection of software modules that support one or more functions, such as reading data from data reception hardware, which is separate from, but called as needed by, various processes, such as those that make up the device operating system or utility software. Thus, in some embodiments the SMS Firewall is inserted into the flow in a way that permits it to perform its intended functions by replacement of one or more of the DLLs used to interface with the device's data reception hardware, transfer data to device processes such as the SMS Queue Insertion process, or used in the transfer of SMS data from the receiving hardware to components of the SMS message reception and processing flow. In some exemplary implementations, the SMS Firewall performs at least some of the processing that would have been carried out by the DLL it replaced, when appropriate, and in other exemplary implementations the SMS Firewall passes control to the required function from the DLL it replaced when its own processing is done, before it begins its own processing, or at any other required point in the processing. Either method of implementation permits the remainder of the device's software to continue functioning normally despite the presence of the SMS Firewall in the SMS message reception and processing flow. Provision and implementation of these elements will be familiar to those having ordinary skill in the art.

In some exemplary implementations of the current invention, the SMS Firewall is inserted into the SMS message reception and processing flow prior to the SMS Queue Insertion step, as depicted in FIG. 7b (7100). Here, the SMS Firewall is inserted into the processing flow such that the Operating System (7120) routes SMS message data to the SMS Firewall (7130) rather than the SMS Queue Insertion mechanism (7140). The SMS Firewall is thereby able to examine received SMS messages prior to their being processed by other aspects of the device, and can discard messages which are to be blocked, record messages which are to be logged, and pass messages, intact or altered as required, that qualify for passage through the SMS Firewall to the SMS Queue Insertion mechanism (7140) for the processing that would have occurred for the message in the absence of the SMS Firewall. All components of the SMS message reception and processing flow shown at 7100, other than the SMS Firewall (7130) are identical to those described above (FIG. 7a (7000)). Message data is received and converted by Data Reception (7110), routed by the Operating System or its supporting systems (7120), inserted into an appropriate SMS message queue (7140) (if it is passed by the SMS Firewall), and processed as appropriate to the message type and the device's design and configuration (7150).

In still other exemplary device implementations the SMS Firewall is inserted into the SMS message reception and processing flow by operating system function calls, modification of operating system or other software, reconfiguration of hardware settings, such as interrupt vector registers, or by other means known to those with skill in the art. Provision and implementation of these elements will be familiar to those having ordinary skill in the art.

Figure 7C:
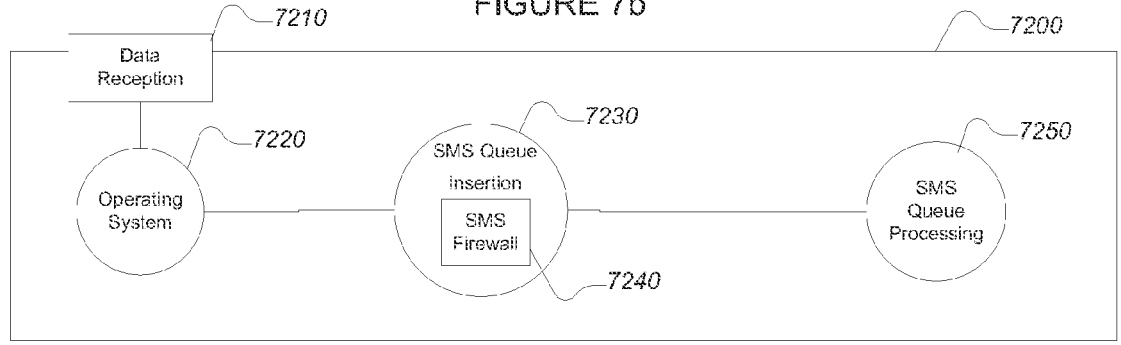

In exemplary implementations where insertion of the SMS Firewall into the SMS message reception and processing flow cannot be performed as described above for FIG. 7b and depicted at 7100, the SMS Firewall is provided as a part of the SMS Queue Insertion mechanism, as depicted in FIG. 7c (7200). In this implementation, the data is received and converted by Data Reception (7210), and routed by the Operating System or its supporting systems (7220) to the SMS Queue Insertion mechanism (7230). The SMS Queue Insertion mechanism (7230), as part of its functioning, invokes the SMS Firewall (7240), which then has an opportunity to examine the SMS message data and decide whether to discard it and abort further processing by the SMS Queue Insertion mechanism (7230) if the message is to be blocked, to record messages which are to be logged in an exfiltration cache, and permit messages that qualify for passage through the SMS Firewall to be queued normally by the SMS Queue Insertion mechanism (7230). In some embodiments the foregoing is performed after modification of the message, and in other embodiments the foregoing is performed with no modification of the message. The SMS Queue Processing mechanism (7250) then processes the SMS messages that were not blocked in the normal way. The method of including the SMS Firewall into the SMS Queue Insertion mechanism in this way varies with the design of the SMS Queue Insertion mechanism. In some exemplary implementations, the SMS Queue Insertion mechanism supports "plug-in" modules, and the SMS Firewall is implemented as a plug-in module. In other exemplary implementations, the SMS Queue Insertion mechanism makes use of DLLs of supporting software and the SMS Firewall is implemented to take the place of one or more of the DLLs. In more specific embodiments, this implementation is performed while still providing the functionality of the library it replaces, or calling on a DLL when appropriate to carry out its functions. Those with skill in the art will know still other methods of including SMS Firewall functionality within the processing of the SMS Queue Insertion mechanism, for example, by completely replacing the SMS Queue Insertion mechanism, and performing the functions of that system in the SMS Firewall, or calling on the original SMS Queue Insertion mechanism to perform its functions only when appropriate (e.g. when an SMS message is not blocked). Provision and implementation of these elements will be familiar to those having ordinary skill in the art.

Figure 7D:
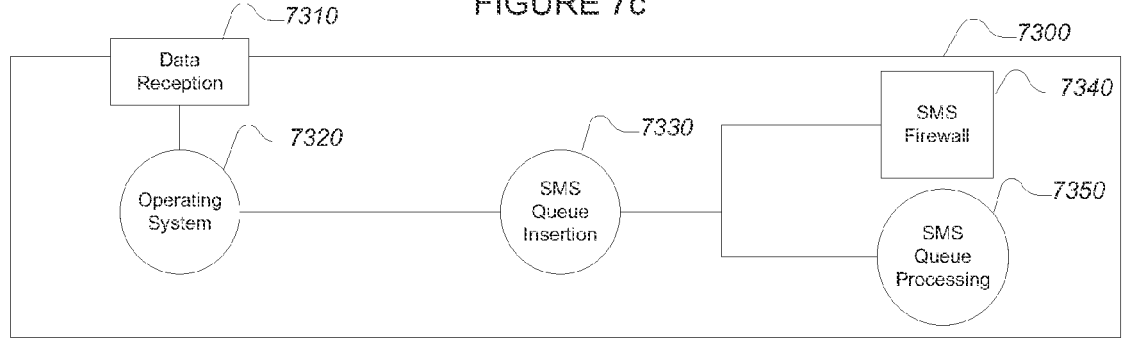

In still other exemplary implementations, the SMS Firewall is installed as an SMS Queue Processing element as depicted in FIG. 7d (7300). In this method, the Data Reception (7310), Operating System (7320), and SMS Queue Insertion mechanism (7330) function as described above for FIG. 7a (7000). The SMS Firewall is the only SMS Queue Processing element (7340), or, in other embodiments, the highest priority SMS Queue Processing element when there are additional SMS Queue Processing elements (7350) on the device. These actions can be accomplished by hiding (such as by renaming elements, moving their location, or deleting pointers to them) the remaining SMS Queue Processing elements, and allowing them access to the SMS message data only after the SMS Firewall has completed processing an SMS message and determined that the message should not be blocked. In exemplary device implementations where SMS Queue Processing elements are dynamically added by other device processes, the SMS Firewall is required to take over such dynamic addition functions from the operating system or other software and control the order of access to SMS message data. In some embodiments, the SMS Firewall is the first to process the message data. In other embodiments, the SMS Firewall checks for dynamic additions and removes or supersedes them. Provision and implementation of these elements will be known to those having ordinary skill in the art.

In some embodiments, the SMS Firewall records the device's configuration, either at boot time or prior to receipt of an SMS message (or, alternatively, at specified or computed intervals), and compares the configuration after processing each SMS message, or, alternatively, each SMS message capable of altering the device configuration, to the recorded configuration. If the device configuration is found to be different from the recorded configuration, the discrepancies can be partially or completely reversed or simply recorded for logging. Configuration elements of concern include, but are not limited to, security settings, installed software, software boot order, stored text messages or other data, plug-in registrations, and communication settings. In more specific embodiments, desirable changes are retained and only undesirable changes are reversed. For example, if a user receives a message that adds or changes a ringtone, reversal of the change could compromise the covert nature of the SMS Firewall; but a message that causes the device to restore its SMS message reception and processing flow to a "factory default" state effectively renders the SMS Firewall ineffective and must be reversed at least to the extent of reinstalling the SMS Firewall into the message reception and processing flow after the normal processing of the SMS message is complete.

Mediation of outgoing SMS messages is handled in a manner similar to that of incoming SMS messages. That is, the SMS Firewall inserts itself into the message processing flow where it can mediate all SMS message traffic, using one or more of the techniques described herein. Exemplary devices can use similar, or different, mechanisms for handling incoming and outgoing SMS messages, and can, in some cases, use different mechanisms depending on the network interfaces that are available at a given time. For example, using GSM mechanisms unless a WiFi connection is available. Regardless of the specific methods employed, the techniques described herein can be used to mediate the SMS messages being sent by, or sent to the device.

6.2.1 User Interface

When deployed non-covertly, the SMS Firewall can comprise an optional User Interface (UI) to permit the device user to interact with the SMS Firewall on the device for purposes of altering SMS Firewall configuration settings, to view SMS Firewall current configuration settings or to receive alerts and other messages from the SMS Firewall. In some exemplary embodiments, the UI comprises a Graphical User Interface (GUI) made up of various icons, images, text, indicators or other elements as are familiar to those with ordinary skill in the art. In other exemplary embodiments, the UI comprises a "text-only" display. In still other exemplary embodiments the UI comprises various indicators, such as lights, vibrations, sounds or similar methods of signaling relevant status or setting information to the device user. In still other exemplary embodiments, any or all of these methods can be used, as determined by the SMS Firewall configuration.

One possible, exemplary, non-limiting embodiment of an SMS Firewall UI comprises a GUI, the initial (main) display of which provides the following status information:
Firewall status—"enabled" or "disabled".
Incoming SMS message behavior profile—"low", "medium" or "high".
Outgoing SMS message behavior profile—"low", "medium" or "high".
Bluetooth behavior profile—"low", "medium" or "high"

The main display also comprises controls for switching to an "options" display, and for returning to a previous display. The "options" control causes a list of available settings for the currently selected item to be displayed, and permits selection of one of these. For example, if the "Incoming SMS message behavior profile" item is selected when the "options" control is activated, a display that permits selection of "low", "medium", or "high" settings for this configuration setting is presented. The options display further comprises an "OK" control and a "Cancel" control. Activation of the "OK" control causes the currently selected option to be set, while activation of the "Cancel" control results in a return to the previous display without alteration of any configuration settings. Activation of the "Options" control while other items are selected works in a similar manner, as will be clear to those with skill in the art.

In some exemplary embodiments, the display of status values such as "low", "medium", and "high" is done as a summary of a more complex arrangement of configuration settings. For example, the "Incoming" behavior profile can comprise settings for handling incoming calls, with values of "allow all", "allow except for deny list", "deny auto-answered", "deny all except allow-list", or "deny all", settings for incoming SMS messages, with settings such as "allow all", "allow all except deny list", "confirm with user", "deny except for allow list", and "deny all", and settings for Bluetooth such as "allow all", "disable", "invisible", "inactive disabled", and "inactive invisible". Each individual setting can have a related value, the average of which for all selected settings determines the "low", "medium" or "high" choice for the main status display. Other methods are possible, as will be apparent to those with skill in the art. In other exemplary embodiments the actual settings for each item are displayed on the status display without summarizing. Outgoing settings are done in a similar manner, with settings such as "outgoing call" ("allow", "confirm", "deny", etc.), "internet connections" ("allow outbound", "allow all", "confirm", "deny all", etc.), "outgoing SMS" ("allow", "allow except deny list", "confirm", "deny except allow list", "deny", etc.) and "SIM Tool Kit" ("allow", "allow except deny list", "confirm", "deny except allow list", "deny", etc.).

6.2.2 Server Communication

In some exemplary implementations, the SMS Firewall on the mobile device communicates with a Monitoring and Control System for purposes such as verifying proper functioning of the SMS Firewall, exfiltration of logged messages, updating SMS Firewall software or provision of additional software modules as needed to cope with threats or other events, as described elsewhere herein.

The SMS Firewall and the Monitoring and Control System can use any or all methods for exchanging data, requests, or commands as are well understood by those with skill in the art, such as, without limitation, SMS or MMS messages, TCP/IP connections over WiFi, wired Ethernet, GSM EDGE, Bluetooth or any other connection method that supports TCP/IP communication. TCP/IP connections can make use of standard protocols, such as HTTP, FTP, Telnet, or SSH, or use proprietary protocols designed or adapted for the purpose.

Data, requests or commands can be sent as ASCII, UTF or other encoded format text, mutually understood binary bit patterns, executable software objects, structured arrangements of data, such as XML, or any other method of exchange as known to those with skill in the art and usable by the mobile device and the Monitoring and Control System. Some embodiments of the current invention make use of any or all of the above communication methods, protocols and formats, as determined to be appropriate by those having skill in the art.

One possible method used by an exemplary, non-limiting embodiment of the current invention on a mobile device for sending an event notification to a Monitoring and Control System uses an ASCII text-based message format, sent over a TCP/IP connection using the standard HTTP protocol. The exchange involves the following (standard protocol connection and header information omitted for clarity):
SMS Firewall Sends:
GET <URL>&imei=<number>&imsi=<number>&os=<os_name>&action=<action>&message-<description>
The Monitoring and Control System replies with: <status> or <error_code>

Or, in a specific example, a notification that a call was blocked, the SMS Firewall sends:
GET /SMSFirewall.cgi&imei=343434343434348&imsi=5676767676767676&os=symbian&action=block&message=call: 18475553456
The Monitoring and Control System replies with: OK In another exemplary, non-limiting embodiment of the current invention, the exchange of messages is done using a shared binary message formatting, sent using a simple Telnet-like protocol. For example, an SMS Firewall detects an attempt to install software on the mobile device, and requests a decision about how to proceed from the Monitoring and Control System, and the Monitoring and Control System responds with a message telling the SMS Firewall whether to allow the installation, block the installation or to ask the device user:
SMS Firewall Sends:
<validate software message type code> <software fingerprint data>
The Monitoring and Control System replies with:
<validate software message response type code> <action code>

A specific example, where the software installation is permitted, the SMS Firewall sends binary data equivalent to the following hexadecimal byte values:
03 AA AB 34 38 58 78 32 98 94
Monitoring and Control System replies with "allow", encoded as binary data equivalent to the following hexadecimal byte values:

In another exemplary, non-limiting embodiment of the current invention, the SMS Firewall uses the HTTP protocol to interact with a web server that is supporting the Monitoring and Control System. The SMS Firewall running on the mobile device first determines the most recent version number of the SMS Firewall software by requesting this information from the web server. It compares this version number with its own version. If the latest version number is greater than the version number of the SMS Firewall running on the mobile device, the latest version is requested, and installed. The exchange involves the following:

SMS Firewall Requests the Following URL:
https://www.smsfirewallserver.com/latestversion
Server Responds: E1.2.3
SMS Firewall Requests the Following URL:
https://www.smsfirewallserver.com/downloadlatest
Server responds by sending the binary installation package for the latest version of the SMS Firewall.

Other exchanges between exemplary embodiments of an SMS Firewall and a Monitoring and Control System of the current invention can be performed similarly to those described above, or using other methods as described herein, or any other method as will be well understood by those having skill in the art.

6.2.3 Reboot, Reinitialization and Reset

Even if the SMS Firewall closely controls all SMS message traffic, and STK interactions with the handset, there are some events that cannot be prevented. For example, a device can be rebooted by removal and reinstallation of the power source (e.g. the battery), some devices incorporate a reset switch that is a hardware method of causing the device to return to factory default settings, and some STK commands might not be subject to interception by the SMS Firewall on some devices. A means of detecting and responding to a disablement of the SMS Firewall in such cases is needed.

When the SMS Firewall is deployed overtly, it can signal its presence and proper operation through interaction with the user interface (UI) of the device. By use of on-screen display of text or icons, by audible signal, or such means as flashing lights, the user can be made aware of the state of the SMS Firewall, and can take corrective action, such as reinstallation, if it is not functioning. Such methods are well understood by those having ordinary skill in the art.

In some exemplary implementations, the SMS Firewall periodically contacts the Monitoring and Control System; and a failure to make such contact can indicate the removal or disabling of the SMS Firewall. In still more specific exemplary embodiments, in response to such indication, the SMS Firewall is redeployed, OTA or otherwise, as described herein. In some embodiments, the mobile device's use of the provider network and servers can be disabled at the provider to prevent use of the device until the SMS firewall is restored to functionality. This ensures that the device is protected from harmful messages, and unauthorized data exchanges are prevented, while the SMS Firewall is not functioning. In covert deployments, such disabling of service can prompt the user to take the device for servicing, where the SMS Firewall can be restored and service re-enabled. Provision and implementation of these elements will be familiar to those having ordinary skill in the art.

6.2.4 Incoming Message Processing

Figure 8:
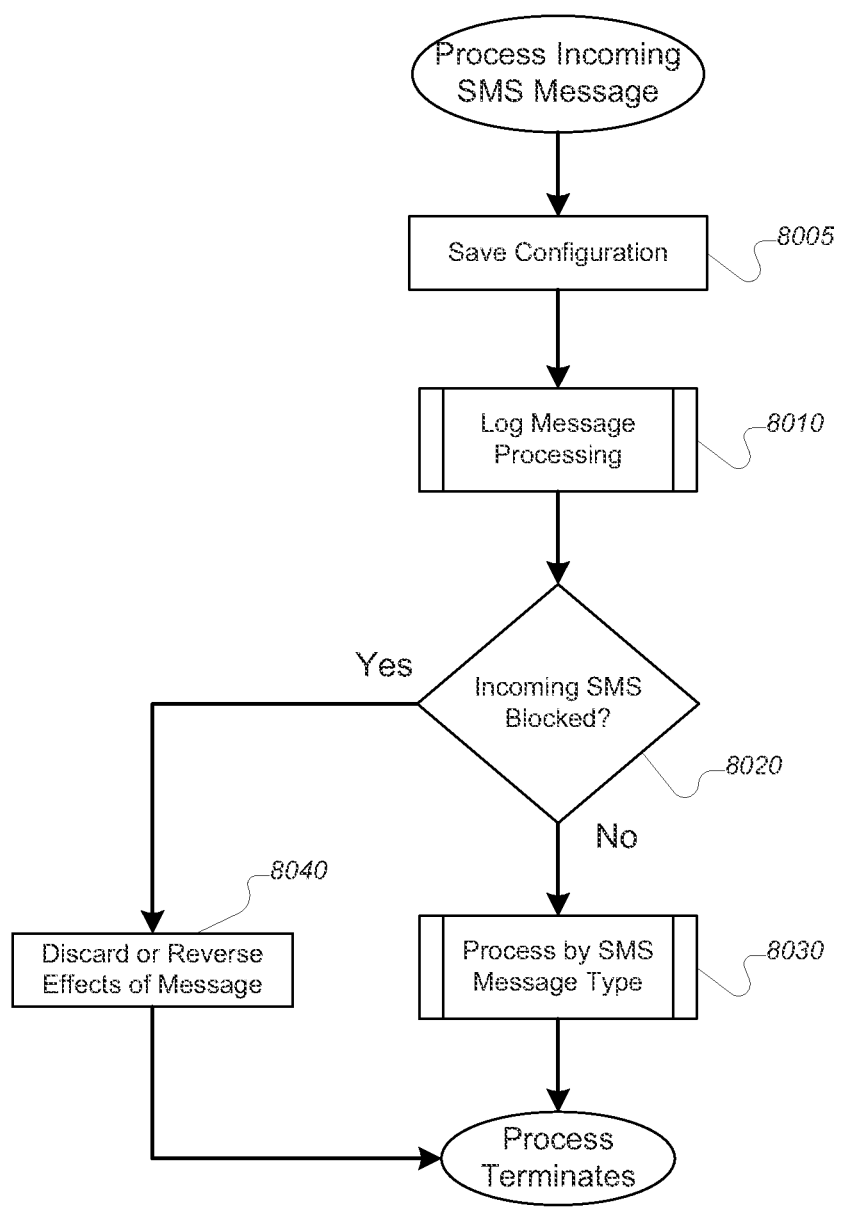
FIG. 8 depicts a flowchart that describes the processing of an incoming SMS message in accordance with one embodiment of the invention.

FIG. 8 depicts a process flowchart that shows the steps involved in processing an incoming SMS message in one exemplary implementation of an SMS Firewall. When an SMS message is received, the SMS Firewall saves the configuration of the device (8005), in case it is necessary to reverse, in full or in part, the effects of the SMS message on the device. In some exemplary implementations, this is done at the time the SMS Firewall is instantiated and again when the configuration is altered; in other exemplary implementations periodically at pre-determined or computed intervals; and in still other exemplary implementations at the time an SMS message is received. In other exemplary implementations the configuration is not saved, for example when the SMS Firewall can be sure that no SMS message could affect the device unless the SMS Firewall permits the message to be processed after determining that it is a permitted message type. In still other exemplary implementations, configuration saving is only required for certain SMS message types (i.e. those that are capable of making unpermitted changes to the device configuration), and not done for other message types. The SMS Firewall then determines whether to record the SMS message, in whole or in part, and whether derivative data, such as message counts from a particular source or average message size, should be recorded for exfiltration to a logging server (8010) or for display to the device user. The details of this process appear below. Once log processing is complete, the SMS Firewall checks its configuration settings to see if all SMS messages are currently blocked (8020), and, if they are, discards the SMS message (8040) or reverses the effects of the message on the device (or both), and the process is complete. If SMS messages are not currently blocked (8020), the message is processed according to its type (8030), which is described more fully below. Implementation of the foregoing will be understood by persons having ordinary skill in the art.

Figure 9:
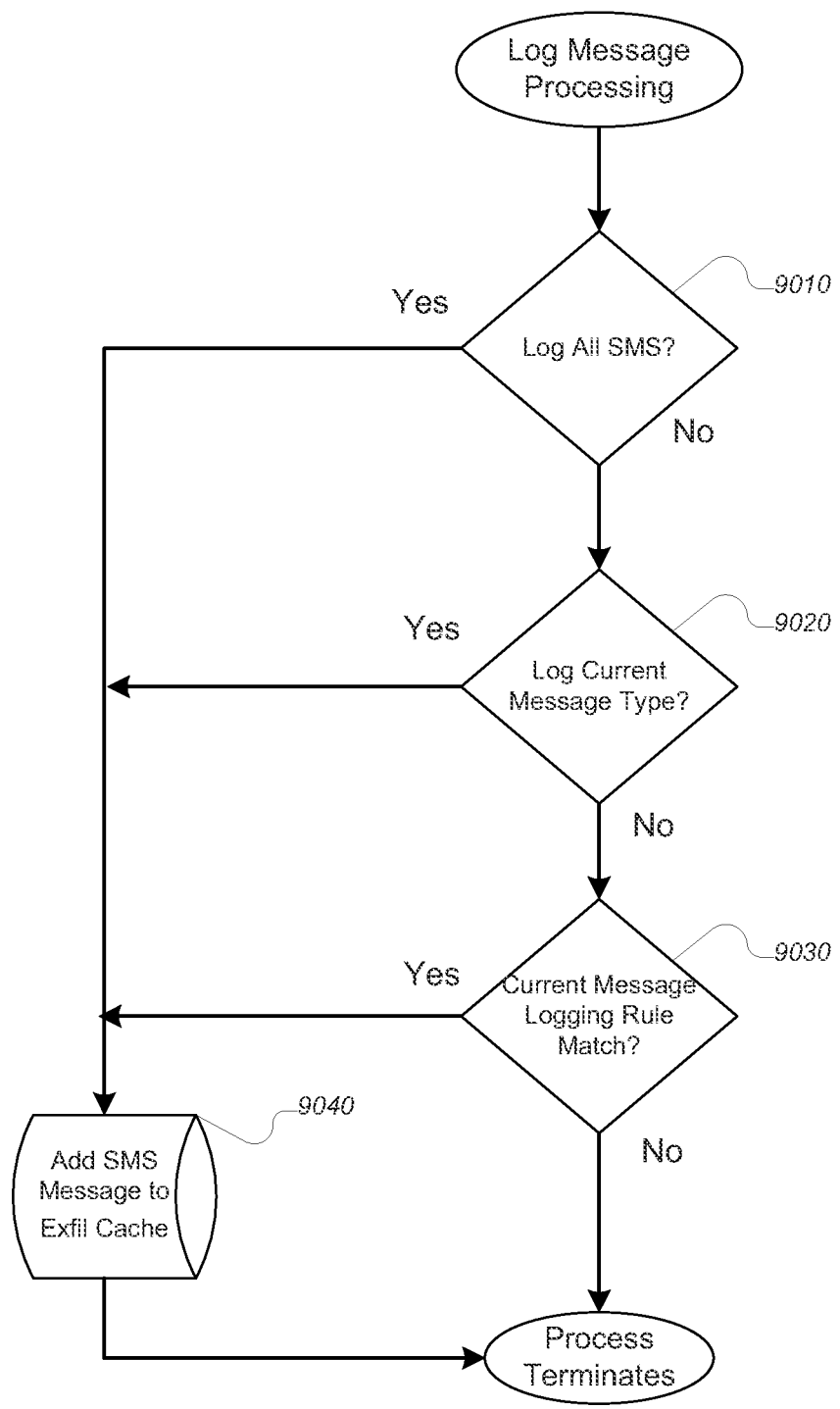
FIG. 9 depicts a flowchart that describes the Log Message Processing step of FIG. 8 in accordance with one embodiment of the invention.

In some embodiments, SMS message log processing determines whether or not to record an SMS message in an exfiltration cache for later sending to a logging server in the monitoring and control console. In more specific embodiments, all SMS messages are recorded; in other embodiments, only those of particular types are recorded; and in still other embodiments, rules determine whether a particular message should be recorded, such as by specifying times, sources, or included content, or combinations of message features, such as specific content from specified sources, or particular message types during certain times of day, or between particular points in time. FIG. 9 illustrates an exemplary process of the invention in which the SMS Firewall checks its configuration to see if all SMS messages are to be logged (9010), and if so, adds the SMS message to the exfiltration cache (9040) for later sending to a logging server, after which the process is complete. If all SMS messages are not being logged (9010), a check is made to see if the message is of a message type that is being logged (9020), and if so, the SMS message is added to the exfiltration cache (9040) for later sending to a logging server and the process is complete. If the message is not of a type that is being logged (9020), the message is checked to see if it matches any existing logging rules (9030). If it matches at least one rule (9030), it is added to the exfiltration cache for later sending to a logging server (9040) and the process is complete. Otherwise the message is not added to the exfiltration cache, and the process is complete. Those persons having ordinary skill in the art will be able to implement these actions.

Figure 10:
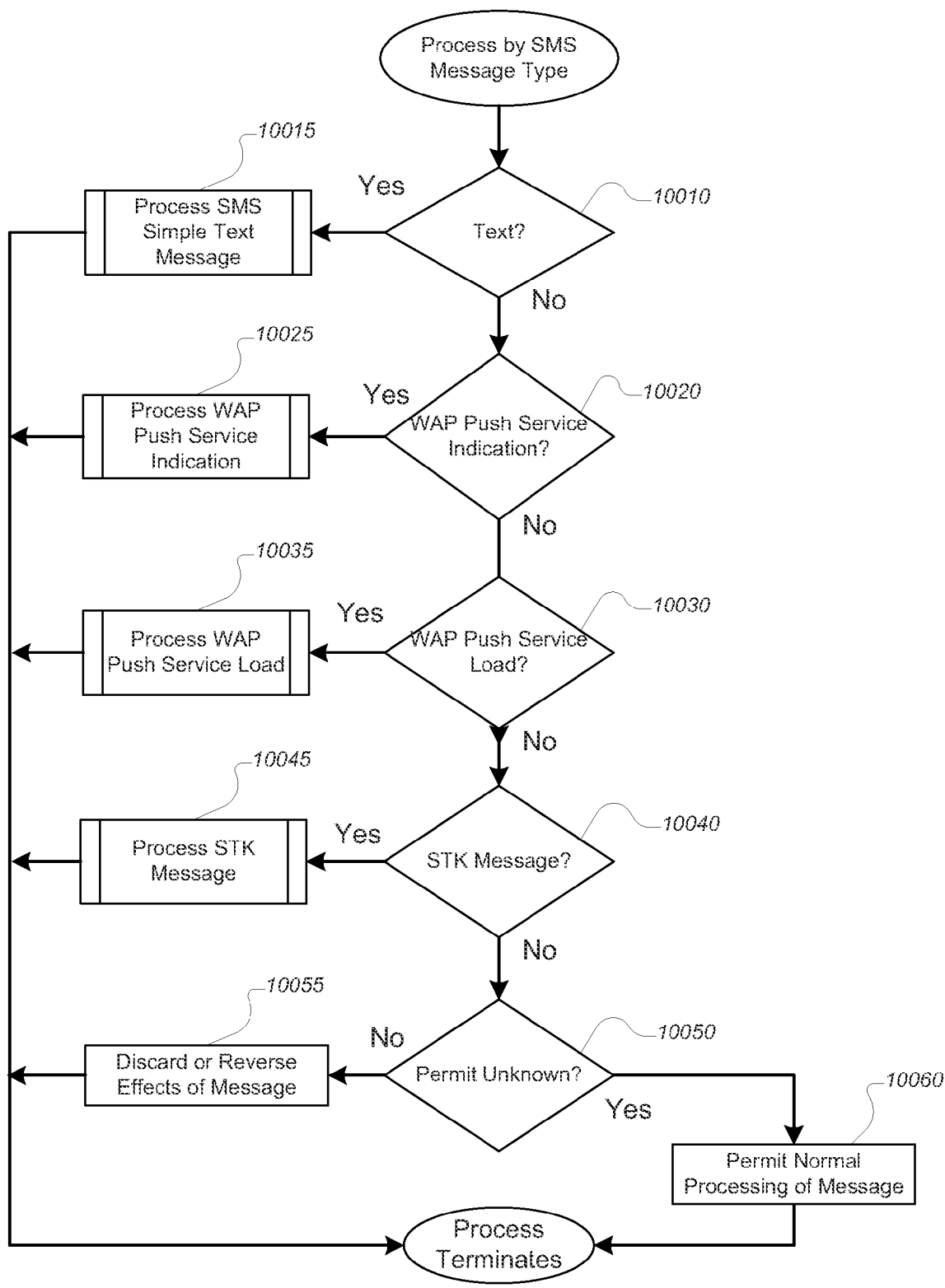
FIG. 10 depicts a flowchart that describes the Process by SMS Message Type step of FIG. 8 in accordance with one embodiment of the invention.

In some embodiments, each type of SMS message is processed according to methods related to the type of SMS message. As shown in FIG. 10, one exemplary process first checks to see if the SMS message is a Simple Text SMS message (10010). If the SMS message is a Simple Text SMS message, then the Text Message processing (described below) (10015) is performed and the process is complete. If the SMS message is not a Simple Text SMS message, then a check is made to see if it is a WAP Push Service Indication (SI) message (10020). If the SMS message is an SI message, then the WAP Push Service Indication processing (10025) (described below) is performed on it, after which the process is complete. If the SMS message is not an SI message, then a check is made to see if it is a WAP Push Service Load (SL) message (10030), and if it is, then the WAP Push Service Load processing (10035) (described below) is performed and the process is complete. If the SMS message is not an SL message, then a check is made to see if it is a SIM Application Toolkit (STK) message (10040), and if it is, then the STK message processing (10045) (described below) is performed, and the process is complete. If the SMS message is not a STK message, then a check is made of the SMS Firewall configuration to see if unknown SMS message types are to be blocked (10050). If unknown SMS message types are to be blocked (10050), then the SMS message is discarded or its effects are reversed (10055), or both, and the process is complete. If unknown SMS message types are permitted, then the SMS message is processed normally (10060) and the process is complete. As will be apparent to those with skill in the art, the method of checking SMS message type and invoking the required processing steps for each type just described is only one of many possible methods, and the substitution of a different, but functionally equivalent, method, such as performing type checks in another order, or using a lookup table to branch to the proper procedure, has no adverse effect on the functioning of the SMS Firewall and is merely an implementation detail.

6.2.4.1 Simple Text SMS Messages

Figure 11:
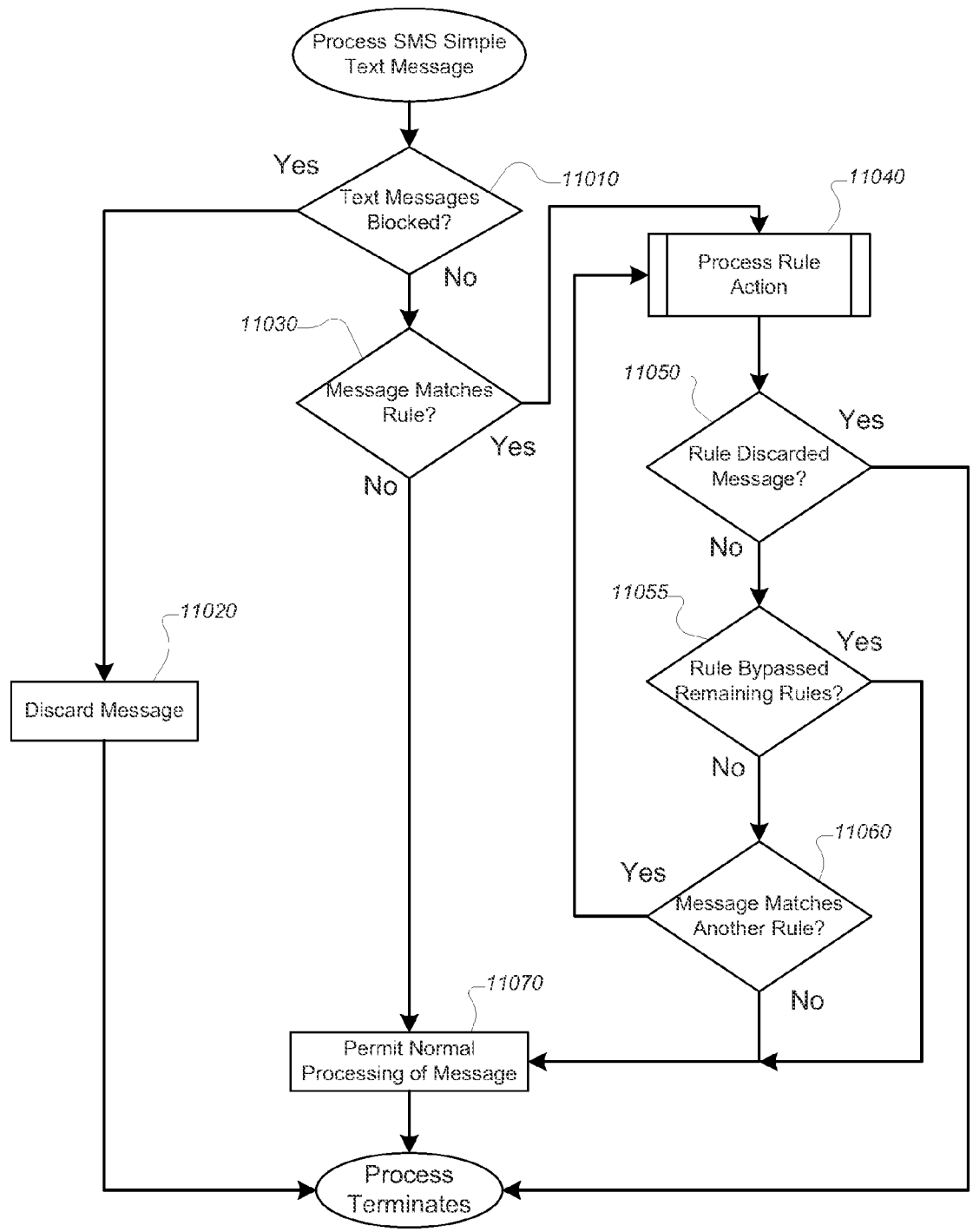
FIG. 11 depicts a flowchart that describes the Process SMS Simple Text Message step of FIG. 10 in accordance with one embodiment of the invention.

As depicted in FIG. 11, in one embodiment Simple Text SMS message processing begins with a check of the SMS Firewall configuration settings to see if such messages are blocked (11010), and if so, then the message is discarded (11020) and the process is complete. If Simple Text SMS messages are not blocked, then a check of the rule set for Simple Text SMS messages is made to see if any rule in the rule set matches the message being processed (11030). If there is no match, then the message is permitted through the SMS Firewall, and is processed normally (11070). If there is a match (11030), then the action specified by the rule is processed (11040) as described below. If the processing of the rule resulted in the message being discarded (11050), then the process is complete. If processing of the rule did not result in the message being discarded (11050), then a check is made to see if the rule specified that the remaining rules should be skipped (11055). If the remaining rules are skipped (11055), then the normal message processing is performed and the process is complete. If the remaining rules are not skipped, then a check is made to see if the SMS message matches another rule (11060). If there are no more rules that match the message (11060), then the message is permitted through the SMS Firewall and processed normally (11070), after which the process is complete. If the message does match another rule (11060), then the rule is processed (11040), a check is made to see if the rule processing discarded the message (11050), and the process either continues checking for matching rules (11060) and processing their actions (11040) until the message has been discarded (11050), which completes the process, or all rules have been checked (11060) without discarding the message and normal message processing permitted (11070), thus completing the process. These actions can be implemented by persons having ordinary skill in the art.

In some embodiments, the rules for matching Simple Text SMS messages include partial or complete matching of message data, such as, without limitation, origin address, subject, time or time interval of transmission or delivery, sender, message text, or any combination of these. Specifications can include "wild cards", which match some or all of a given message attribute or attributes, or even "regular expressions", which permit complex and flexible specification of matching conditions. Exemplary implementations can specify any or all of these methods. Still other methods will be apparent to those having ordinary skill in the art.

Actions associated with rules can include, for example and without limitation, discarding the matching SMS message, permitting normal processing of the matching SMS message without checking additional rules, saving the SMS message to the exfiltration cache for sending to a logging server, processing the SMS message in some manner other than normal, such as with a special background color, for example green or red, to indicate the importance, safety, potential danger, security level, or other aspect of the message, use of a different audible alert to indicate reception of the message, modification of the message data, or forwarding of the message to one or more additional recipients, with or without the knowledge of the current recipient. As indicated by the process flow of FIG. 11, when a Simple Text SMS message matches a plurality of rules, a plurality of actions can be processed for the message. These actions can be implemented by persons having ordinary skill in the art.

6.2.4.2 WAP Push Service Indication (SI) Messages

Figure 12:
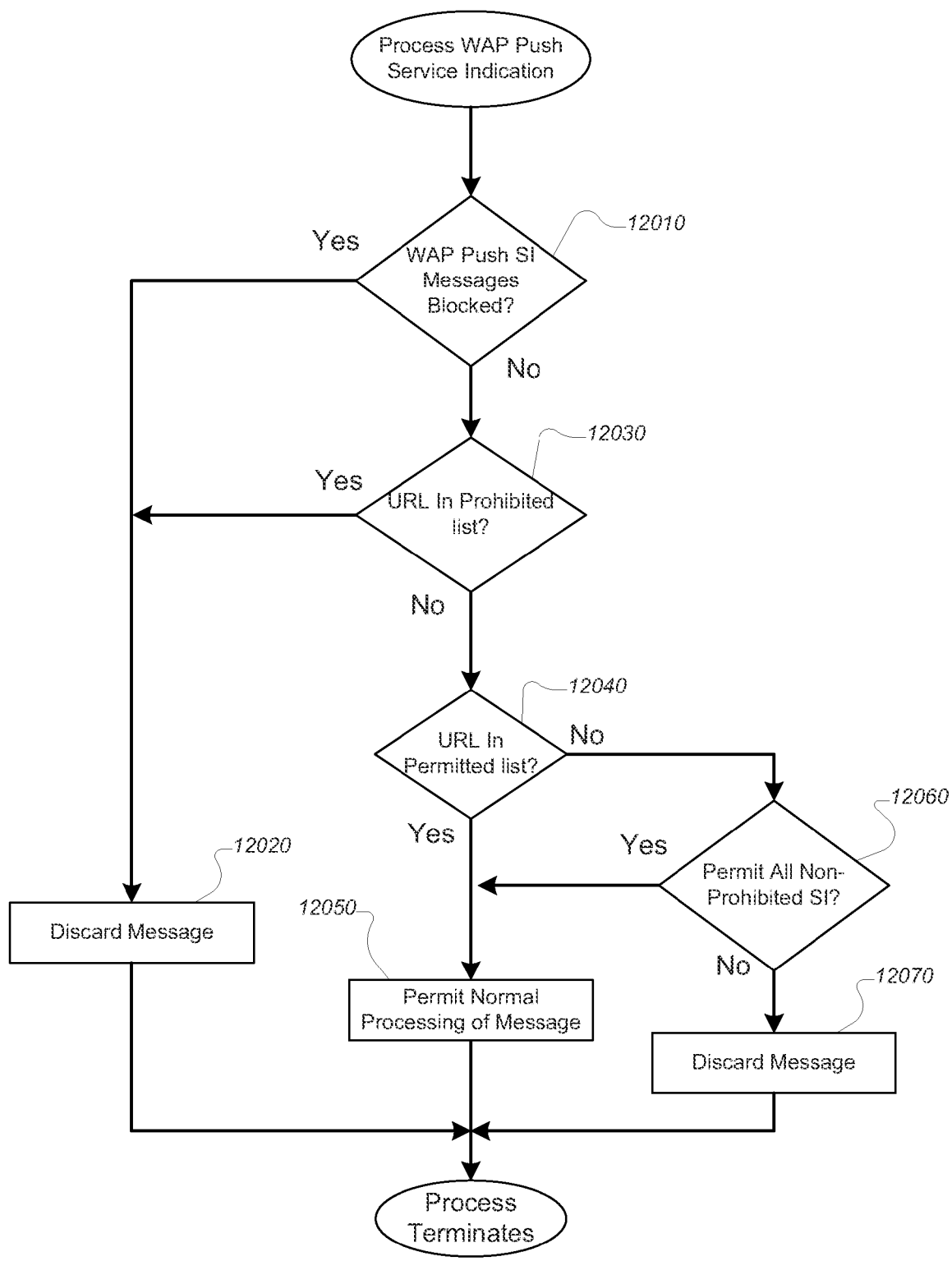
FIG. 12 depicts a flowchart that describes the Process WAP Push Service Indication message step of FIG. 10 in accordance with one embodiment of the invention.

FIG. 12 depicts an embodiment of the invention in which WAP Push Service Indication message processing begins with a check of the SMS Firewall configuration settings to see if such messages are blocked (12010). If the messages are blocked, then the message is discarded (12020) and the process is complete. If WAP Push Service Indication messages are not blocked, then a "deny list" check is made (12030) to see if the URL specified in the SI message is on a list of prohibited domains. If the URL specified in the SI message is on a prohibited list (12030), then the message is discarded (12020) and the process terminates. In some exemplary implementations, the user is notified that the SI message was discarded. In other exemplary implementations the SI message is discarded silently, with no indication to the device user. If the URL specified in the SI message is not on a prohibited list (12030), then a check is made to see if it is on an "allow list" of specifically permitted URLs (1200). If the URL is on the "allow list", then the SI message is processed normally (12050) and the process is complete. If the URL is not on a permitted list (12040), then the SMS Firewall checks its configuration to see if all non-prohibited URLs are to be permitted (12060). If non-prohibited URLs are to be considered permitted, then the SI message is processed normally (12050) and the process is complete. If URLs must appear on a permitted list to be processed normally, then the SI message is discarded (12070) and the process is complete. These actions can be implemented by persons having ordinary skill in the art.

In some exemplary implementations, "deny list" and "allow list" as used above do not refer to literal lists of full URL specifications, but include partial URL specifications and "wildcards" or make use of "regular expressions" (as described above) to permit matching between the specification and a particular example of a URL found in an SI message. In still other exemplary implementations, the "deny list" and "allow list" can refer to a procedure for determining the acceptability or non-acceptability of a particular URL, for example by contacting a server where such information is available, asking the device user for a decision, or through other means as determined to be proper by those having skill in the art.

6.2.4.3 WAP Push Service Load (SL) Messages

Figure 13:
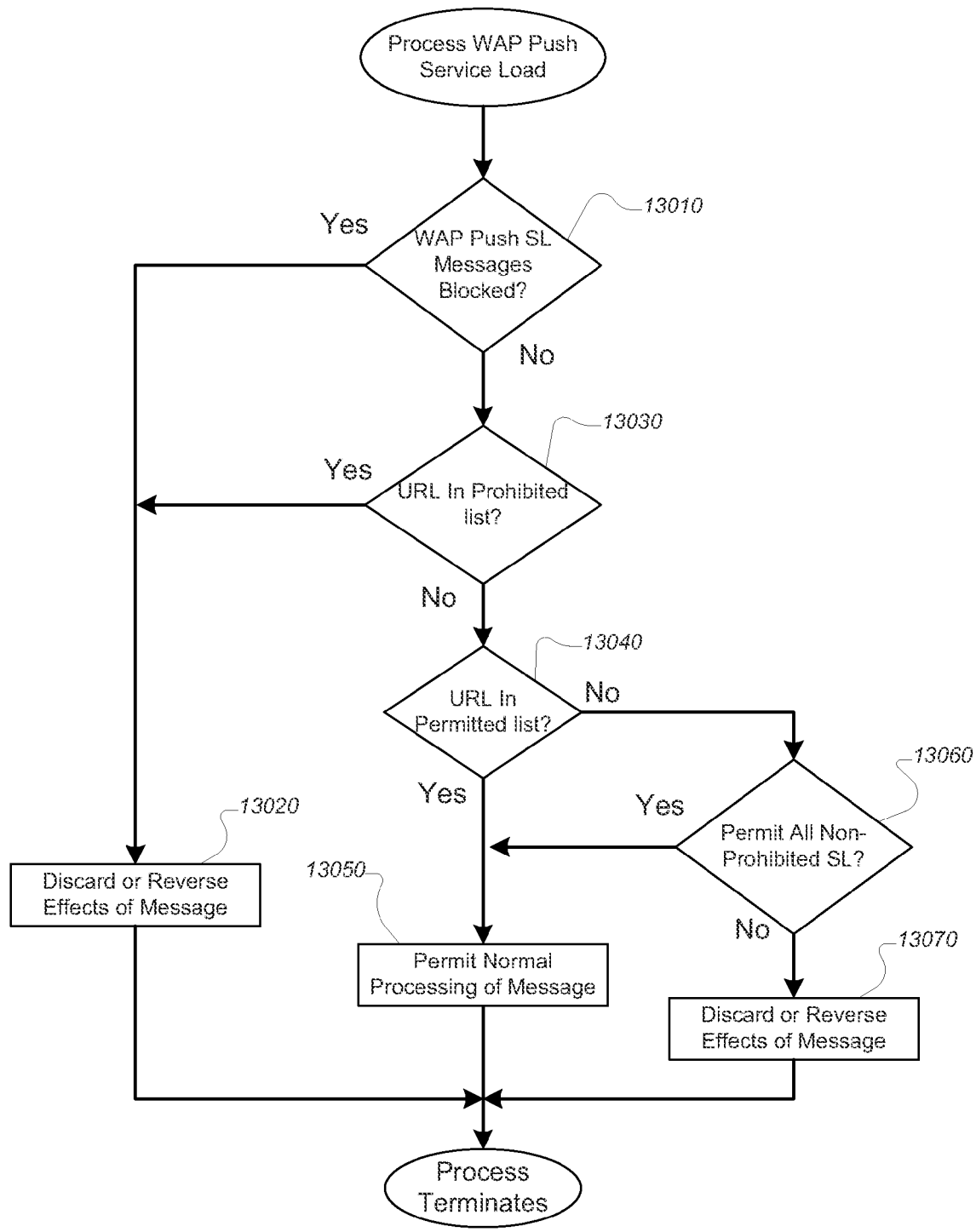
FIG. 13 depicts a flowchart that describes the Process WAP Push Service Load message step of FIG. 10 in accordance with one embodiment of the invention.

FIG. 13 illustrates one embodiment of a method for processing WAP push messages. The WAP Push Service Load message processing begins with a check of the SMS Firewall configuration settings to see if such messages are blocked (13010). If the messages are blocked, then the message is discarded or its effects, if any, reversed (13020) and the process is complete. If WAP Push Service Load messages are not blocked, then a "deny list" check is made (13030) to see if the URL specified in the SL message is on a list of prohibited domains. If the URL specified in the SL message is on a prohibited list (13030), then the message is discarded or its effects, if any, reversed (13020) and the process terminates. In some exemplary implementations, the user is notified that the SL message was discarded. In other exemplary implementations the SL message is discarded or reversed silently, with no indication to the device user. If the URL specified in the SL message is not on a prohibited list (13030), then a check is made to see if it is on an "allow list" of specifically permitted URLs (1300), and if it is, then the SL message is processed normally (13050) and the process is complete. If the URL is not on a permitted list (13040), then the SMS Firewall checks its configuration to see if all non-prohibited URLs are to be permitted (13060). If non-prohibited URLs are to be considered permitted, then the SL message is processed normally (13050) and the process is complete. If URLs must appear on a permitted list to be processed normally, the SL message is discarded or reversed (13070) and the process is complete. These actions can be implemented by persons having ordinary skill in the art.

In some exemplary implementations, "deny list" and "allow list" as used above do not refer to literal lists of full URL specifications, but include partial URL specifications and "wildcards" or "regular expressions" to permit matching between the specification and a particular example of a URL found in an SL message. In still other exemplary implementations, the "deny list" and "allow list" can refer to a procedure for determining the acceptability or non-acceptability of a particular URL, for example by contacting a server where such information is available, asking the device user for a decision, or through other means as determined to be proper by those having skill in the art.

6.2.4.4 SIM Application Toolkit (STK) Messages

Figure 14:
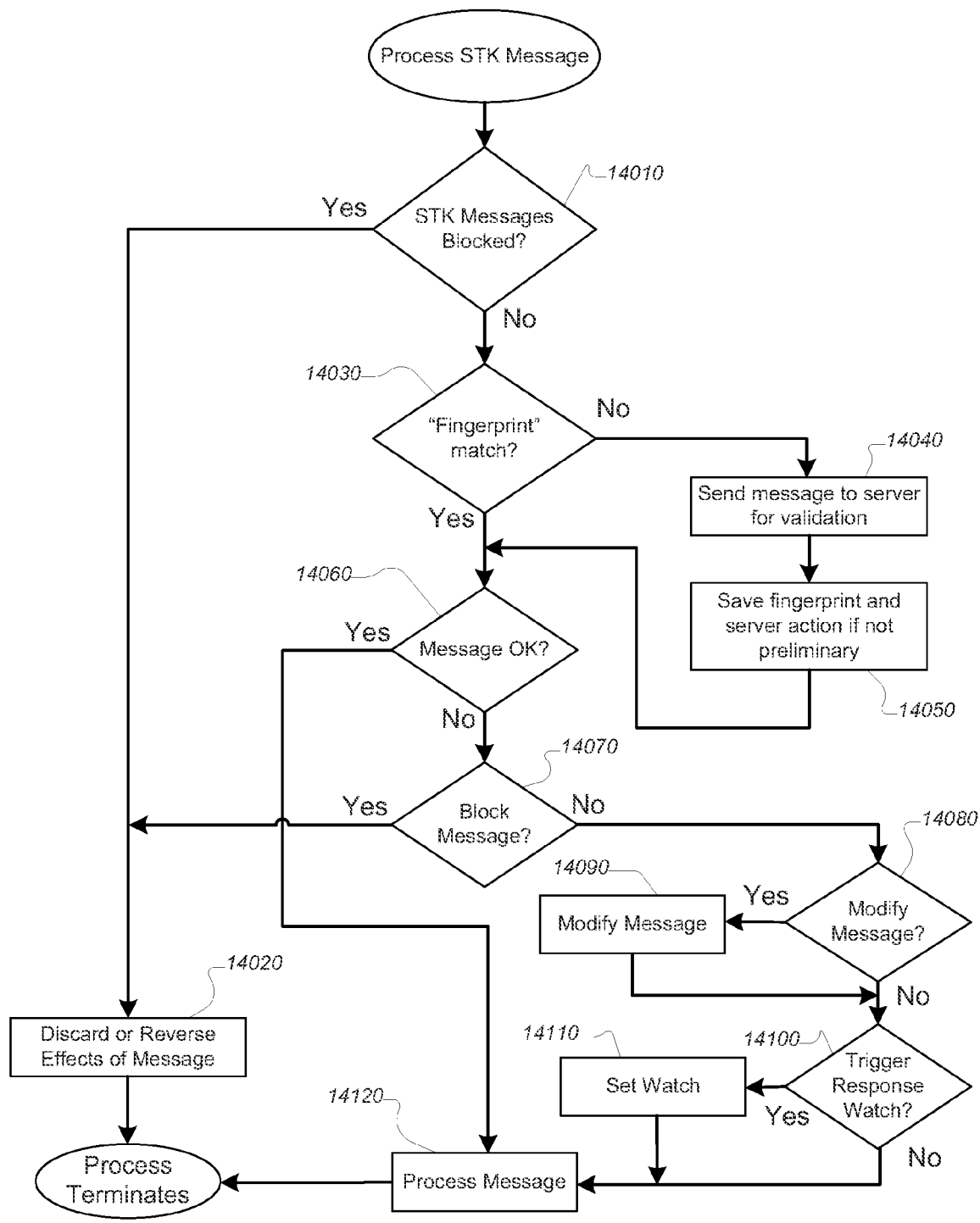
FIG. 14 depicts a flowchart that describes the Process STK Message step of FIG. 10 in accordance with one embodiment of the invention.

FIG. 14 illustrates one embodiment of a method for processing STK messages. The SIM Application Toolkit (STK) message processing begins with a check of the SMS Firewall configuration settings to see if such messages are blocked (14010), and if so, then the message is discarded or its effects, if any, reversed (14020) and the process is complete. If STK messages are not completely blocked, then a check is made to see if the particular message matches a "fingerprint" for known STK messages (14030), and the associated action, or actions, identified. As used herein, a "fingerprint" is a value computed from some or all parts of a message that can be used to identify known similar or identical messages in an efficient manner, without requiring access to the actual content of the known messages, or any knowledge of the purpose or internal structure of the message's User Data. This can be particularly useful when a message embodies a protocol of unknown structure (is "opaque"), such as some binary SMS messages using protocols proprietary to particular organizations, and is not limited only to use with STK messages. A plurality of fingerprints can be computed for a given message, using a plurality of methods. For example, a first fingerprint can be computed from the entire message, a second fingerprint can be computed from the message but omitting the UD field, while a third fingerprint can be computed from the UD field alone. Other methods are possible, as will be apparent to those having skill in the art. Each computed fingerprint is checked against a set of known fingerprints by the SMS Firewall (14030).

If no fingerprint matches are found, then the message is sent to a server for validation and determination of the proper action(s) to take (14040). The server computes a fingerprint for the message, and determines the appropriate action(s) to take for the message. The server can determine the appropriate action(s) by looking up the fingerprint in a database or known messages (which can be significantly larger than what is supportable on a mobile wireless device), by performing an automated analysis of the message, by requesting a determination of proper action from human operators, or by a combination of these or other methods as determined to be proper by those having skill in the art. In some exemplary implementations, the server returns a preliminary action to the SMS Firewall to limit delay while analysis, particularly human analysis, is in progress. In some embodiments, preliminary actions are not stored for future use by the SMS Firewall, and are designed to be conservative in what is allowed. For example, a preliminary action can be to block the message. Once a preliminary or non-preliminary action or actions are determined, the server returns the fingerprint and the action to the SMS Firewall. Non-preliminary actions are stored (14050) for future reference. The SMS Firewall can delete stored fingerprints to free storage space when storage space reaches a configured or computed level, when the number of stored fingerprints reaches a configured or computed count, when fingerprints have not been used for a configured or computed period of time, or by other criteria as determined by those having skill in the art.

Once a fingerprint match is determined, whether from previously stored fingerprint data or from values returned from a server query, the associated action is executed. One possible action is to approve the message for normal processing. If the action is to approve the message (14060), then the message is processed (14120) and the process terminates. If the message is not approved (14060), then a check is made to see if the message is to be blocked (14070). If the message is to be blocked, then it is discarded or its effects reversed (14020), and the process is complete. If the message is not to be blocked, then a check is made to see if it should be modified (14080), such as by altering the commands or data contained in it. If modification is specified as an action for the STK message (14080), then the message is so modified (14090). A check is then made to see if a response watch should be triggered for the STK message (14100). Some STK messages, such as a "Read Binary" message, optionally result in response messages being sent, which the SMS Firewall should block or modify. In more specific embodiments, the triggering of a response watch results in the SMS Firewall expecting such a response message to be sent and retaining data about the STK message that generated the response for use in deciding whether to block or modify the response message. If a response watch is triggered, then the watch is set (14110) and the message is then processed (14120), and the process is complete. These actions can be implemented by persons having ordinary skill in the art.

Persons having ordinary skill in the art will appreciate that the use of fingerprints to determine actions to take for STK messages is not only efficient in terms of SMS Firewall storage and processing workload, but it can be necessary in some cases, e.g., where the STK message contains proprietary protocols, the effects of which are not computable by the SMS Firewall. Humans can analyze such messages, and determine appropriate actions for dealing with them. This information, and the identifying fingerprint of the message, can be stored in a server database for use by the SMS Firewall when it encounters a matching message. This is similar in some ways to how anti-virus software on personal computers detects and deals with computer viruses and the concepts and techniques are well understood by those with skill in the art.

Some known uses for STK messages that can be detected, logged, blocked or modified, include:
Launching the browser on the device.
Incoming and Outgoing SMS Text.
DTMF commands.

Displaying text to the user.

Providing Location Information, time, Mobile Equipment status.

Running an AT Command (such as to place a voice call or establish a data connection).

Set up a BIP connection.

Disabling the device's transmitter and/or SIM.

By providing a capability to block or otherwise limit STK messages, the exemplary SMS Firewall can prevent use of the STK for making unauthorized purchases, dialing phone numbers silently and using the device as a remote listening unit, disclosing the device's location, installing software without permission, transferring device data files without permission, or other such actions, as well as using STK messages to interfere with the proper functioning of the SMS Firewall, such as by altering device configuration settings.

6.2.5 Outgoing Message Processing

Figure 15:
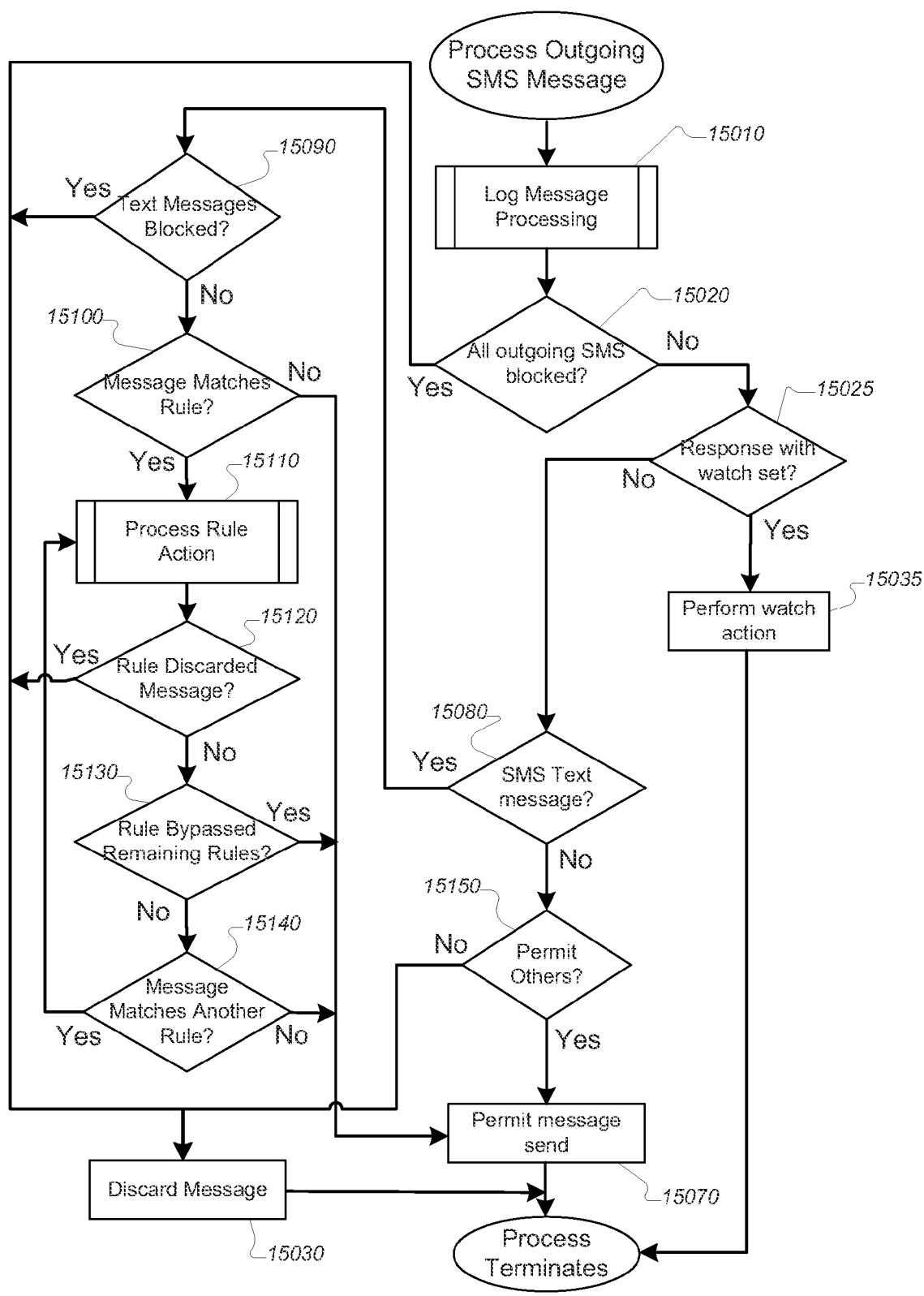
FIG. 15 depicts a flowchart that describes the processing of an outgoing SMS message in accordance with one embodiment of the invention.

FIG. 15 depicts a process flowchart that shows the steps involved in processing an outgoing SMS message within the SMS Firewall in accordance with the invention. When an SMS message is being sent, the SMS Firewall determines whether to record the SMS message, in whole or in part, and whether any derivative data, such as message counts to a particular destination or average message size, should be recorded for exfiltration to a logging server as described above for incoming log message processing (15010). Once log message processing is complete, the SMS Firewall checks its configuration settings to see if all outgoing SMS messages are currently blocked (15020). If all outgoing SMS messages are currently being blocked, the SMS Firewall discards the SMS message (15030) and the process is complete.

If all outgoing SMS messages are not currently blocked (15020), then a check is made to see if there is a response watch set for this message (15025). If there is a response watch set, the associated action is performed (15035) and the process is complete. If there is no response watch set for this message (15025), and the message is an SMS Simple Text message (15080), the SMS Firewall configuration is checked to see if outgoing SMS Simple Text messages are currently blocked (15090). If outgoing SMS Simple Text messages are currently blocked (15090), then the message is deleted (15030), and the process is complete. If SMS Simple Text messages are not currently blocked (15090), then the message is matched against rules that apply to outgoing SMS Simple Text messages (15100). If no rules match, then the message is permitted to be sent (15070) and the process is complete. If a rule does match (15100), then the action associated with the rule is performed (15110). If the rule action resulted in the message being blocked (15120), then the message is deleted (15030), and the process is complete. If the rule action did not result in the message being blocked (15120), and the rule bypassed all remaining rules (15130), then the message is permitted to be sent normally (15070), and the process is complete. If the rule action did not result in the remaining rules being bypassed (15130), then the next matching rule is located. If there are no more rules that match the message (15140), then the message is sent normally (15070), and the process is complete. If there are additional rules that match the message (15140), then the actions associated with the rule are performed (15110), and the process continues until all rules have been checked (15140), the message is blocked (15120), or remaining rules are bypassed (15130). If the message was not blocked as a result of this, then the message is permitted to be sent normally (15070) and the process is complete. These actions can be implemented by persons having ordinary skill in the art.

Actions associated with rules for outgoing SMS Simple Text messages can include, for example and without limitation: discarding the matching SMS message, permitting normal processing of the matching SMS message without checking additional rules, saving the SMS message to the exfiltration cache, use of an audible, vibratory or visual alert to indicate sending of the message, modification of the message data, forwarding of the message to one or more additional recipients, with or without the knowledge of the current recipient, or, when not deployed covertly, asking the device user for authorization to send the message. As indicated by the process flow of FIG. 15, when a Simple Text SMS message matches a plurality of rules, a plurality of actions can be processed for the message.

If the message is not an SMS Simple Text message (15080), then the SMS Firewall configuration settings are checked to see if other types of outgoing SMS messages are to be blocked (15150). If other types of outgoing SMS messages are to be blocked (15150), then the message is discarded (15030), and the process is complete. If other types of outgoing SMS messages are not blocked (15150), then the message is permitted to be sent normally (15070), and the process is complete. These actions can be implemented by persons having ordinary skill in the art.

Persons having ordinary skill in the art will understand that by supporting a flexible method of dealing with outgoing SMS messages that can treat messages differently based on content, destination, source, type or other factors, the SMS Firewall permits desirable communications while blocking undesirable communications, and optionally logs either or both types for future reference, in an auditable manner that does not permit device user tampering with the data so collected. These capabilities support regulatory compliance, such as Sarbanes-Oxley or HIPPA, security concerns in government, military, or other organization environments, limit the capability of covertly installed software to exfiltrate data, and prevent unauthorized data transfers of all types.

6.2.6 Dealing With Software Installation Attempts

Persons having ordinary skill in the art will understand that new software installed on a wireless mobile device can pose a threat to the integrity of the SMS Firewall. Some software, such as anti-virus software, is designed to detect and prevent some of the mechanisms used by the SMS Firewall, and could reduce its effectiveness, or disable it entirely. Other software is intended to interfere with device operation, to transmit data without authorization, or to make use of the device in ways that are not appropriate. There is a desire, both for SMS Firewall integrity and to protect the wireless mobile device and the data it contains or processes, to limit or prevent installation of software on the wireless mobile device unless that software is authorized, and determined to be benign to the SMS Firewall.

Some embodiments of the invention include methods for preventing unauthorized software installation, including: blocking SMS message types that can be used to install software, and blocking the establishment of data links over which software can be downloaded to the wireless mobile device, by redirecting data connections through the monitoring and control console so that all data, including software downloads, are vetted and approved before reaching the wireless mobile device, or, in other embodiments, by redirecting data connections through the monitoring and control console so that alternative, more benign, software can be substituted for harmful software. Redirecting connections through the monitoring and control console can be done, for example, by re-provisioning the wireless mobile device, and setting its WAP gateway to be the monitoring and control console's WAP Gateway server, rather than the WAP Gateway the wireless mobile device was originally provisioned with. The monitoring and control console's WAP Gateway server then functions as a proxy, allowing or blocking access to other network servers as appropriate, and filtering or substituting data in transit to or from the wireless mobile device. These actions can be implemented by persons having ordinary skill in the art.

In some embodiments, the SMS Firewall blocks only some software installations, while permitting others. Configuration of the SMS Firewall includes, among other aspects, provision of a means of recognizing permitted software. Such means can comprise an "allow list" of software that is permitted, while all other software installations are to be blocked. Alternatively, some embodiments comprise a "deny list" of software that is not to be permitted, while all other software installations are allowed. Still other alternative embodiments comprise more complex means, such as specification of byte patterns to be searched for in software, expressions that specify permitted sources of software or sources that should be blocked, and actions that should be taken by the SMS Firewall when messages attempting installation of software matching any of these are detected. Actions can include, for example, blocking installation, permitting installation, forwarding software to a Monitoring and Control System, quarantine of the message until permission to install it is received from the monitoring and control console or, in some exemplary embodiments, from the device user, requesting additional analysis software or data from the Monitoring and Control System or other server to be used in deciding whether the software in question should be installed or blocked, or other actions as may be deemed proper by those having skill in the art. Some exemplary implementations can make use of a plurality of these methods, such as allow listing some software, deny listing some software, analyzing the rest for specific byte patterns and forwarding software that matches a byte pattern to a Monitoring and Control System while quarantining the software and blocking installation until the Monitoring and Control System returns a command to install or not install the software.

Figure 16:
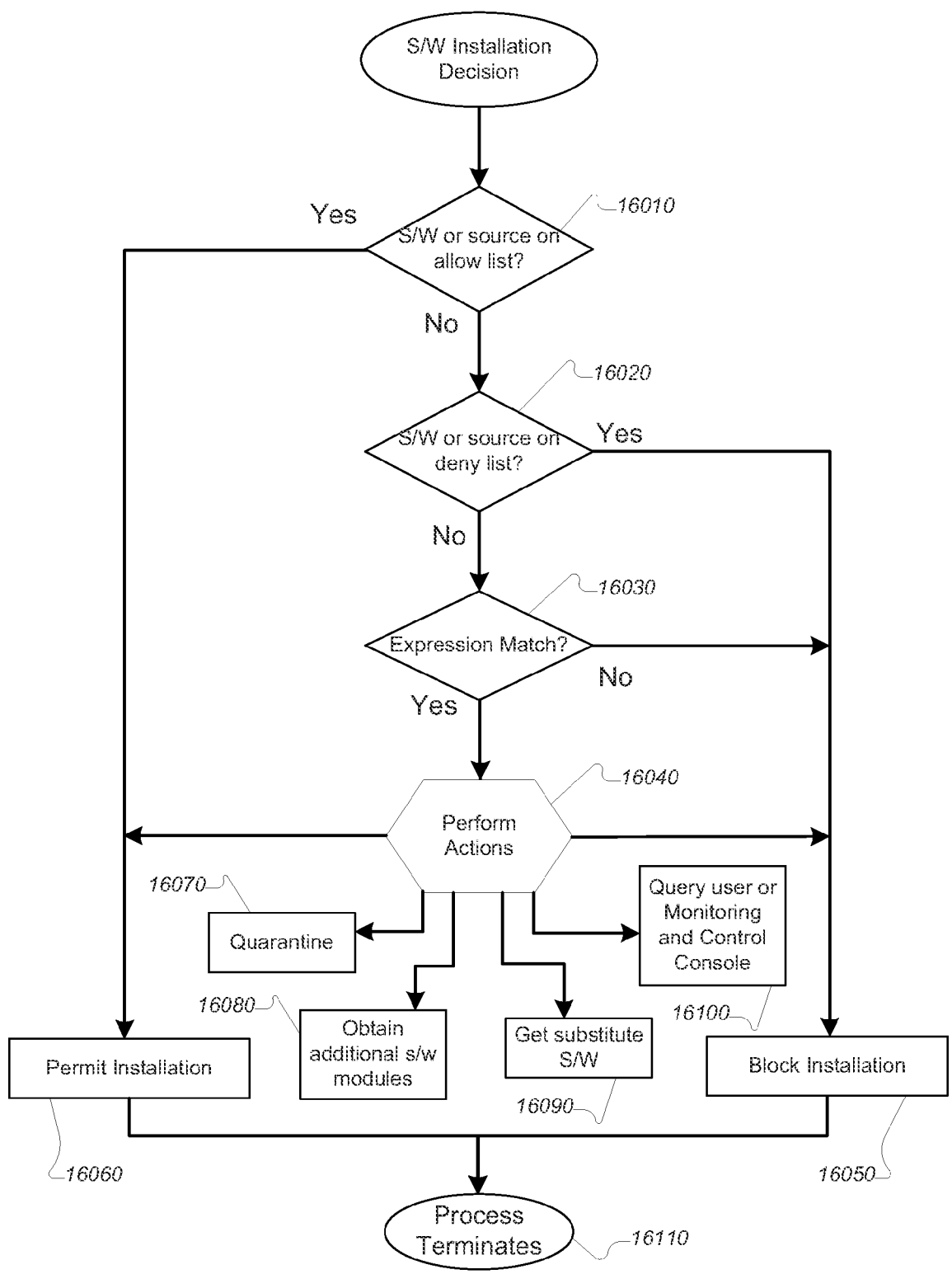
FIG. 16 depicts a flowchart that describes the process for deciding whether a requested software installation should be permitted as requested, or whether other actions should be taken instead.

FIG. 16 shows an example flowchart for the decision process in an exemplary embodiment that uses a plurality of methods. The exemplary SMS Firewall first checks to see if the software is on an "allow list" of permitted software (16010). If the software is on an "allow list", installation is permitted (16060) and the process is complete (16110). If the software is not on an "allow list", the SMS Firewall next checks to see if it is on a "deny list" of prohibited software (16020). If it is on a "deny list", installation is blocked (16050) and the process ends. In some embodiments, blocked software is deleted from the device. In other embodiments, blocked software is forwarded to a logging server or Monitoring and Control System for recording and/or review. Review of the software, possibly including previously logged blocked software, can result in the software being added to an "allow list" in some cases, the source of the software being added to a "deny list" in other cases, or a threat level change.

If the software is not on an allow list or deny list, the SMS Firewall then checks to see if the software matches any known expressions (16030). Expressions can involve any known aspect of a message or device, such as the message source, message type, software being requested for installation, size of the software, size of the software in relation to the device's remaining resources, time of message arrival, current device location, the number of applications installed in a specified prior time period, etc. The result of the expression evaluation is the performance of one or more actions, and a decision as to whether to permit (16060) or block (16050) installation of the software. Actions can comprise any number of actions, such as quarantine of the software (16070) until a decision whether to install it or not is provided by another entity, such as the device user or the Monitoring and Control System, obtaining additional software modules (16080) to use for evaluating the software, its source or other aspects of the situation or for collecting additional data to use in making the decision, obtaining other software to substitute for the software requesting installation (16090), and querying the device user or Monitoring and Control System for a decision. One exemplary sequence of actions might comprise quarantine of the software, obtaining additional software modules to evaluate the situation, using the output of those modules to determine that substitution of different software is appropriate, obtaining substitute software and permitting installation of the substitute software, while sending the originally requested software to the Monitoring and Control System for logging and review, followed by deletion of the originally requested software from the mobile device. Regardless of the actions taken, the process is not complete (16110) until a decision has been made about whether to permit installation (16060) or to block it (16050).

6.2.7 Non-SMS Firewalls

In some embodiments, the device uses communication technologies such as TCP/IP over Wi-Fi, various protocols over wired interfaces such as USB or Ethernet, wirelessly using TCP/IP over cellular data networks (e.g. GPRS or EDGE), or P2P technologies such as Bluetooth or IRdA. There are well-understood methods for providing firewall protection to such technologies, particularly when TCP/IP protocols are used. The SMS Firewall can optionally comprise such additional firewall protection technologies where this is advantageous, or can co-exist with such technologies when they are provided by other means, such as being incorporated into the device operating system, added as a separate processing facility, or otherwise. Due to its ability to be inserted into the SMS processing of the device, the SMS Firewall can operate on all SMS message traffic, regardless of the communication path that is used to transmit it. For example, if an SMS message is received via a TCP/IP WiFi communication path, it is placed into the SMS message processing flow just as if it had arrived via the GSM control channel. The SMS Firewall, by the methods described elsewhere herein, is capable of mediating the message once it enters the SPS message processing flow. In some exemplary embodiments, the SMS Firewall can be constructed to make use of specific capabilities of particular non-SMS Firewall firewalls, such as a TCP/IP firewall's application programming interface (API), and make use of such capabilities to mediate any SMS message that is processed by the non-SMS Firewall. This capability is useful when dealing with "combination attacks", where a plurality of communication protocols and methods are used in combination. For example, an SMS Short Text message might be sent to a device user with instructions to follow a URL link to obtain some benefit. When the user follows the link using a web browser over a Wi-Fi link using TCP/IP, malicious code is installed on the device. In another example, a malicious application is installed using an SMS WAP Service Load attack, and the application then uses a Wi-Fi connection to improperly exfiltrate confidential data from the device. By protecting the device from SMS-based threats, and interacting as needed with protection systems that deal with threats of other types, combination attacks are prevented.

6.2.8 Blocking Transmission and Reception

As described above, incoming and outgoing SMS message traffic can be blocked by deleting messages in the SMS Firewall processing. This method is necessary when a subset of messages must be blocked, but when all messages are to be blocked, an alternative method involves the SMS Firewall turning off the wireless mobile device's radio. This method can also result in blocking voice phone calls, data exchange using other networks, such as Wi-Fi, and in some situations, such as when the SMS Firewall has been deployed covertly, can result in the user presuming the device has suffered hardware or software failure.

There are scenarios, such as when a device is being tracked by its radio emissions, when turning the device's radio off is desirable, and in such scenarios the user can be notified with a message or indicator on the device display, an audible or vibratory alarm, flashing lights, or by other means when the SMS Firewall has not been deployed covertly. In some embodiments, such radio disablement is performed by user command. This is useful when the device cannot be temporarily silenced by means such as removing its power source, and can also be useful even when the device is not being tracked, but radio emissions are not desirable, such as during travel on commercial airliners.

When device tracking is being performed such as by accessing a location-reporting application installed on the device, which can return, among other data, the ID of the cell that the device is currently receiving service from, other cells the device can detect, the signal strength of the cell signals, or the GPS-determined location of the device, and turning off the device radio is not desired, the SMS Firewall can block such messages, or alter the response messages to contain erroneous ID or location information. Such alterations can cause the device to appear to be in a location where it is not, or to be moving when it is static, or to be static when it is moving, and thus defeat tracking or location attempts. In some embodiments, the SMS Firewall indicates a specific erroneous cell ID, or a sequence of specific erroneous cell IDs, or specific erroneous GPS locations, or a sequence of specific erroneous GPS locations, so that it is known where those attempting to track the device will be looking for it, potentially making it easier to locate them. Behavior profiles that define the pattern of alterations to be made to location-reporting SMS messages can be pre-established and enabled as required, such as when specified patterns of SMS message activity is monitored by the SMS Firewall, or when a command to activate them is received from the UI or Monitoring and Control System. These functions can be implemented by persons having ordinary skill in the art.

Turning off the wireless mobile device's radio circuitry is also advantageous when certain cells in the network have been deny listed as insecure or hostile in some way. For example, Class 0 ("silent SMS") messages can be used to cause a device to respond and thus permit detection of the device, either through the cell with cooperation from the service provider, or by use of other radio detection equipment. In some embodiments, the SMS Firewall can periodically re-enable the radio to see if the device has been moved to a location with a non-deny listed cell, and turn the radio off again if not. In embodiments including devices with GPS receivers, the SMS Firewall can use the GPS-determined location of the device to tell when the device has been moved, and thus avoid the need for periodic checks involving communication with the local cell transmitter. In exemplary embodiments that comprise a user interface, the user can be informed when radio transmission is disabled to avoid such detection. These actions can be implemented by persons having ordinary skill in the art.

6.2.9 Behavior Profiles

Some embodiments support named sets of configuration parameters and associated value settings ("behavior profiles"), that when activated cause the SMS Firewall to implement particular device and SMS Firewall configurations on command, by user request (when deployed non-covertly and with a UI), or in response to particular events or threat level settings. Behavior profiles specify such configuration options as, for example and without limitation:

Block all outgoing SMS messages.
Block all outgoing Simple Text SMS messages.
Block all incoming SL messages that specify a particular URL.
Turn off the radio for a specified time period, or until the device's GPS indicates it has moved a specified distance or to a specified location.
Alert user to current threat level.
Alter exfiltration behavior to be stealthier, occur more frequently, occur less frequently, etc.
Block particular types of SMS message reception (e.g. Simple Text, WAP Push Service Load or STK).
Start or Stop logging data for exfiltration.
Log additional detail about SMS messages processed.

In some exemplary embodiments, behavior profiles can be "nested". That is, a first behavior profile can optionally specify one or more second behavior profiles. When the first behavior profile is activated, the one or more second behavior profiles are also activated. The effect is as if a third behavior profile that encompasses all of the settings specified by the first behavior profile and the one or more second behavior profiles were activated. Conflicts between settings of the first and one or more second behavior profiles can be dealt with in different ways by various exemplary embodiments. For example, some exemplary embodiments will treat the first behavior profile as authoritative, and ignore conflicting settings from any second behavior profiles named by the first behavior profile. In other exemplary embodiments will treat the second behavior profiles as more authoritative than the first behavior profile, and override the first behavior profile's settings where there is a conflict. When two or more second behavior profiles conflict, they can be processed in the order they are named, or in the order they were defined, or in some other established sequence as may be deemed proper by those having skill in the art. In yet other exemplary embodiments, behavior profiles comprise a priority attribute, and the behavior profile with the higher priority will supersede those with lower priorities where there are conflicts between them. Other methods of dealing with conflicting settings are possible, as will be understood by those having skill in the art.

In more specific exemplary embodiments, the configuration settings of the behavior profile, or profiles, after resolving any conflicts, are set as the current configuration of the SMS Firewall, replacing the previous configuration when the threat level changes or, in other embodiments, upon user and/or monitoring console command. In some embodiments, behavior profiles can be updated as needed, either by the user, through interactions with a UI, or by commands sent from a Monitoring and Control System.

In some exemplary embodiments, additional software modules can be provided to the SMS Firewall. These additional software modules can be instantiated immediately upon receipt in some exemplary embodiment, while in other exemplary embodiments instantiation can be tied to one or more behavior profiles and activated only when such a behavior profile is active. In some exemplary implementations instantiation can be tied to a particular threat level, with the module being active only while a particular threat level, or set of threat levels, are set. The particular additional software modules provided to the SMS Firewall can be determined, in some exemplary embodiments, by a human operator at a Monitoring and Control System, and in some exemplary embodiments, by the device user. In some exemplary embodiments, the modules to be provided to the SMS Firewall can be determined automatically, either by the SMS Firewall or by the Monitoring and Control System. Automatic determination can be based on a plurality of factors, such as the types of messages being detected by the SMS Firewall, the specifics of software installations being attempted (e.g. the type of software involved, the specific software package involved, the frequency of installation attempts, etc.), the type of mobile device the SMS Firewall is installed on, the kind of service plan the user has signed up for, etc. Additional software packages can be used to collect additional information, enable the SMS Firewall to deal with particular message types more efficiently or with a greater specificity as to message content, to counteract changes made by specific message types, to provide additional protection to the mobile device, its data or configuration, or for any other purpose as determined to be useful by those having skill in the art.

6.2.10 Threat Levels

Some exemplary implementations of the SMS Firewall provide a capability referred to herein as "threat levels". A "threat level" as defined herein is a configuration setting that indicates the level of concern currently existing for one or more aspects of wireless mobile device security. Some exemplary embodiments provide for only one threat level to be active at any given time, while other exemplary embodiments can provide for a plurality of threat levels to be active simultaneously.

In some embodiments, the threat level is determined by using one or more of a variety of factors, such as device location or current cell ID, SMS message reception rate, the number of SMS messages that have been blocked or altered in the recent past, attempts to install hostile software on the device, attempts to disable the SMS Firewall, the receipt of deny listed URLs in WAP Push messages, detection of specified content in Simple Text SMS Messages being sent to or from the wireless mobile device, or commands from the Monitoring and Control System that specify the threat level to set. In some embodiments, threat levels determine which of a set of defined behavior profiles to activate so as to limit mobile wireless device use and functionality consistent with the types of threats being encountered or anticipated. In other embodiments, alteration of threat level results in a change in the behavior profiles used so as to match the new threat level, whether this is a greater level of threat, a lesser level of threat or simply a different type of threat (e.g. location tracking rather than attempting installation of software).

In some alternative exemplary embodiments, threat levels can comprise a time after which the threat level is reduced or eliminated if the condition that resulted in the threat level being set is no longer present. For example, if a threat level of "software-install-attempt" was set due to detection of SMS messages attempting improper software installation, this threat level can, in exemplary embodiments supporting such a feature, be implemented such that if 1 hour passes with no SMS software install messages arriving, the "software-install-attempt" threat level is removed. If a particular embodiment uses a different threat level scheme, such as a numerical sequence where lower number indicate lower threat levels and higher numbers indicate greater threat levels, the automatic threat level reduction can reduce the threat level by one step per hour, or at any other rate that is deemed proper by those having skill in the art, the device user, a company policy committee or others having an interest in the security of the device. In some exemplary embodiments the rate of threat level reduction or increase happens at a rate that is at least partially random, so that attackers can not know exactly when the threat level will be reduced. For example, such embodiments might permit specifying the rate as "one step per hour, plus or minus 1 to 15 minutes".

Threat level determination is made, in some embodiments, by the SMS Firewall using information available to it or calculated by it. In other exemplary embodiments, the threat level is provided to the SMS Firewall by a Monitoring and Control System. The Monitoring and Control System can determine the appropriate threat level by having it set by a human operator, or by calculation using information obtained from the SMS Firewall, from a plurality of second SMS Firewalls on other mobile devices, or through other sources such as security organization announcements. In some exemplary embodiments, a plurality of these methods are used.

A "Threat Level" specification in some exemplary embodiments comprises a single value, such as a number, letter, or word (e.g. "low", "medium" or "high") that results in the SMS Firewall adopting a pre-defined set of behavior profiles, or a set of behavior profiles matching a pre-defined pattern (e.g. if the Threat Level is specified as "medium", all behavior patterns whose names start with "medium", or which specify association with "medium" threat levels in their definitions, become active).

Some exemplary embodiments indicate threat levels within a device as a point on a numerical scale in some exemplary embodiments, such as a scale where a threat level of "1" indicates little or no threat, and "10" indicates a serious threat, with intermediate integers indicating intermediate levels of threat. In other exemplary embodiments the numerical scale can be continuous, with real numbers indicating threat level, such as 1.0, 2.6, or 7.98. Likewise, negative values can also be used, for example with a scale extending from −5 to +5. In other exemplary embodiments, threat level is associated with a color code, such as green for little or no threat, yellow for intermediate threat levels and red to indicate the greatest threat. In such embodiments the color code can also be equated to an underlying sequential sequence, such as integer threat levels where this is seen as advantageous by those having skill in the art. Such associations can have utility, for example, when implementing a user interface, where the threat level is maintained internally as, for example, an integer, and ranges of integers are mapped to color codes for use in displaying the threat level to the device user. Other mappings are possible, such as real number threat levels to a "slider" indicator such as those used by many software installations to show progress, an icon that changes size as threat level increases and decreases, an audible indication, such as a sequence of beeps that change pitch, count or rate with threat level, a device vibration that occurs when threat level passes a defined level, or a combination of these or other methods of conveying threat level to the device user or to device software as required.

In yet other exemplary embodiments, threat levels are not organized into an ordered sequence, such as integers or real numbers, but are used to indicate the existence or absence of a particular class of threat, and can be active or inactive individually. For example, an exemplary embodiment can define a threat level called "tracking" that indicates whether or not there have been, or might be, unauthorized attempts to determine the device's location, a second threat level called "data access" that indicates whether or not there have been, or might be, unauthorized attempts to access data stored on the device, and a third threat level called "eavesdrop" that indicates that there has been, or might be, an attempt to activate the device's microphone and send the sounds collected by it to another device. Other threat levels are possible, such as those concerning the device's user disclosing confidential information using SMS or voice methods, software being installed OTA on the device, or just unwanted advertising messages being sent to the device. A given device at a particular time might have no threat levels active, might have a plurality of them active at once, or might have any combination of the threat levels it defines active simultaneously. Indication of the state of any given threat level can be provided by use of icons that represent threat levels and their current state, text displays listing similar information, audible outputs such as voice or tones, vibration of the device, or other methods as will be known to those with skill in the art.

In alternative embodiments, a Threat Level comprises a more complex object, such as an XML file, and/or an executable software object that specifies or implements a plurality of changes to be undertaken by the SMS Firewall as a result of the particular Threat Level being made active. Such changes can comprise activation or deactivation of one or more behavior profiles, download or definition of additional or replacement behavior profiles, deletion of existing behavior profiles, or alterations to device configuration or functioning outside of those specified by behavior profiles, such as by altering the configuration of device applications, installation of additional software, or removal of existing software as well as such actions as alerting of the device user or the monitoring console. For example, in response to a threat of device tracking by hostile entities, an application that is used to report device location, such as a GPS logger application, can be shut down or deleted, or can be reconfigured to report incorrect location data.

6.2.11 Threat Levels and Behavior Profile Activation

In some exemplary embodiments, threat levels are used to activate and/or deactivate behavior profiles or to perform other actions such as executing application software, changing the user interface state, or turning the device off. Threat levels in some exemplary embodiments are determined by events that are detected by the SMS Firewall. Some non-limiting, exemplary events and their associated exemplary behavior profiles and/or actions are:

Type 0 SMS message received: tracking alert actions (e.g., beep device speaker like a fire alarm; send SMS or TCP/IP message to the monitoring console to log occurrence; shut down the phone.)

Device has registered on a hostile mobile operator's system: Set threat level to "10" and enable "Most Secure" behavior profile.

Bluetooth set to discoverable: set Bluetooth to hidden, log occurrence with the monitoring console.

Automatically answered call detected: Hang up call and notify user through speaker and screen display.

Request for location information received: activate location-evasion behavior profile.

The specification of the threat level or levels to associate with particular events, what behavior profiles to activate in response to detection of specific events, or with particular threat levels, and what other actions to take when a given event is detected can be implemented as default behavior in the SMS Firewall in some exemplary embodiments. In other exemplary embodiments such specifications are done through configuration settings of the SMS Firewall, whether performed by the device user through a user interface, by the monitoring console through messages sent to the SMS Firewall, by the SMS Firewall itself, or by other means.

When such event/threat level/behavior profile/action specifications must be transmitted or stored, or for ease in editing the specifications, the specification data can be represented in any convenient form, such as text, and converted to any convenient internal data structure for use by the SMS Firewall, as will be well understood by those with skill in the art. A non-limiting, exemplary embodiment of event/threat level/behavior profile/action specification data in text form is described below. Other embodiments are possible, as will be apparent to those with skill in the art.

In one exemplary embodiment, event/threat level/behavior profile/action specification data comprises a set of rules and relationships between them. Individual rules specify an event, and what is to be done when the event is detected, such as activating a particular threat level and/or behavior profile, or performing a specified action. Rules can have IDs that comprise numbers and/or one or more names so that the rule can be referred to by other rules, by the user interface, in log files, or for other purposes. Numbers and/or names can be unique or shared with other rules, or both within a given embodiment. Rules can be "enabled" or "disabled". A rule that is "enabled" is implemented when the associated event is detected, while a rule that is "disabled" is ignored and has no effect, even when the event associated with it is detected. Relationships between rules can comprise grouping them together, specifying Boolean relationships, such as AND, OR, EXCLUSIVE OR or NOT, or no relationship.

Grouping of rules is useful, for example, so that that they can be enabled or disabled together, without a requirement to specify each individual rule, or so that they can be selected for deletion, editing or other purposes as a group.

Boolean relationships can be between individual rules, or between groups of rules, or both. Such relationships permit specification of more complex patterns of events. For example, one might specify that an incoming SMS message event should result in the logging of the event with a first rule, and that an SMS message from a specified phone number that is requesting device location should result in the requested information being returned with a second rule. Such a pair or rules would result in the logging of the location request message, which might not be desirable in all scenarios. For example, if the application requesting the location information repeats the request often so as to perform detailed tracking of the device, a large number of log entries will result. Without an ability to specify relationships between rules is can be difficult or impossible to avoid such results. With the ability to specify Boolean relationships between rules and groups of rules this problem is easily handled by specifying and "AND NOT" relationship between the first, SMS logging, rule and a third rule that specifies reception of an SMS message from the location-requesting phone number. This would result in logging of SMS messages unless the SMS message is from the location-requesting phone number, while still responding to the request using the second rule.

Specification of rule grouping and relationships can be done in many ways well understood by those with skill in the art. One non-limiting example is to use a standard description language, such as XML, that permits specification of objects and their relationships. By defining XML "tags" for rules, rule groups, and relationships between these, any arbitrary arrangement of rules and relationships is possible. When the event, with any qualifiers that are specified by a rule, is detected, the rule is said to be "triggered". The actions associated with a rule do not occur unless the rule is "triggered". When there are relationships between rules or groups of rules, these relationships must also be satisfied for the rules comprising the relationship to be triggered. Relationships can be "AND", to specify that all rules and groups in the relationship must be triggered for any of them to be triggered, "OR", to specify that if any of the rules or groups in the relationship are triggered, then the rules or groups are triggered, or "XOR" to specify that the rules or groups are triggered only if exactly one of them is triggered. A rule or group's triggered status can be reversed for purposes of deciding such relationships by use of a "ruleNegation" tag. For example:

```
<?xml version="1.0"?>
<ruleset>
    <ruleRelation type="AND">
        <ruleType name="Rule-A">
            [rule definition goes here]
        </ruleType>
        <ruleGroup name="Group-1">
            <ruleRelation type="OR">
                <ruleType name="Rule-B">
                    [rule definition goes here]
                </ruleType>
                <ruleNegation>
                    <ruleType name="Rule-C">
                        [rule definition goes here]
                    </ruleType>
                </ruleNegation>
            </ruleRelation>
        </ruleGroup>
    </ruleRelation>
</ruleset>
```

In this example there are three rules, "Rule-A", "Rule-B" and "Rule-C". The details of the definitions of these rules are omitted for clarity. Rule-B and Rule-C are grouped into a group known as "Group-1". Rule-A and Group-1 have an "AND" relationship; meaning that neither Rule-A nor Group-1 result in any actions, are triggered, unless both are triggered. Within Group-1 there is an "OR" relationship between Rule-B and a negation of Rule-C. This means that the event specified by Rule-B must be detected, or the event specified by Rule-C must not be detected, for Group-1 to be triggered. So if Rule-A's event occurs and Rule-C's event also occurs, both rules' actions are executed. If Rule-B is also triggered, its actions will be executed too, since the Rule-B/Rule-C relationship is an "OR", not an "XOR". If Rule-C's event is detected, then Rule-B's event must also be detected for any actions to be executed.

In the exemplary embodiment being described, individual rules are specified by text in a defined format, such as:

```
<rule ID> : <event> : [<qualifier> [, <qualifier> ... ] : ] <action>
    [, <action> ...]}
```

That is, rule ID information (e.g., number, name, both, etc.), a colon to separate the fields making up the rule specification, an event specification (e.g., SMS-Message-Received, SMS-Message-Sent, Roaming-Change, etc.), an optional list of one or more comma-separated event qualifiers (e.g., Number (123-456-7890), Provider-ID=34571, or SMS-Msg-Type=0), a colon field separator, and a list of one or more comma-separated actions to be taken (e.g. log the event, alert he device user to the event, set a particular threat level, activate a particular behavior profile, increment a counter, start or stop a timer, etc.) if the event is detected with the specified qualifications. In alternate embodiments, rule definitions are specified similarly to the way that rule groups and relationships are specified, such as by an XML-like syntax:

```
<ruleType name="Rule-n">
    <ruleID>
        <ruleName value="name">
        <ruleID value="1234">
    </ruleID>
    <ruleEvent type="SMS-Message-Received">
        <ruleQualifier Number="123-456-7890">
        <ruleQualifier Provider="34571">
        <ruleQualifier SMS-Msg-Type="0">
    </ruleEvent>
    <ruleActionList>
        <ruleAction Value="Log">
        <ruleAction Value="Increment-SMS-Counter">
    </ruleActionList>
</ruleType>
```

The following tables are non-limiting examples of some events and the qualifiers and actions that can be associated with them in the exemplary embodiments being described.

| Qualifiers | Action |
|---|---|
| Event: SMS-Message-Received | |
| Message-Type=<type> | Log-Event |
| Number-From=<number> | Alert-User=<method, message> |
| Body-Contains=<text pattern> | Drop-Message |
| Body-Contains=<binary pattern> | Set-Threat-Level=<level> |
| | Set-Behavior-Profile=<profile> |
| | Activate-Rule=<rule ID> |
| | or <rule group ID> |
| | Deactivate-Rule=<rule ID> |
| | or <rule group ID> |
| | Null-Action |
| Event: SMS-Message-Send | |
| Message-Type=<type> | Log-Event |
| Number-To=<number> | Alert-User=<method, message> |
| Body-Contains=<text pattern> | Block-Send |
| Body-Contains=<binary pattern> | Set-Threat-Level=<level> |
| | Set-Behavior-Profile=<profile> |
| | Activate-Rule=<rule ID> |
| | or <rule group ID> |
| | Deactivate-Rule=<rule ID> |
| | or <rule group ID> |
| | Null-Action |
| Event: MMS-Message-Received | |
| MIME-Type=<type> | Log-Event |
| Number-From=<number> | Alert-User=<method, message> |
| Body-Contains=<text pattern> | Drop-Message |
| Body-Contains=<binary pattern> | Set-Threat-Level=<level> |
| | Set-Behavior-Profile=<profile> |
| | Activate-Rule=<rule ID> |
| | or <rule group ID> |
| | Deactivate-Rule=<rule ID> |
| | or <rule group ID> |
| | Null-Action |
| Event: MMS-Message-Send | |
| MIME-Type=<type> | Log-Event |
| Number-To=<number> | Alert-User=<method, message> |
| Body-Contains=<text pattern> | Block-Send |
| Body-Contains=<binary pattern> | Set-Threat-Level=<level> |
| | Set-Behavior-Profile=<profile> |
| | Activate-Rule=<rule ID> |
| | or <rule group ID> |
| | Deactivate-Rule=<rule ID> |
| | or <rule group ID> |
| | Null-Action |
| Event: TCP-Firewall-Blocked-Packet | |
| Protocol=TCP|UDP|ICMP|IP|OTHER | Log-Event |
| IP-From=<IP Address> | Alert-User=<method, message> |
| Port-To=<Port Number> | Set-Threat-Level=<level> |
| Packet-Contains=<text pattern> | Set-Behavior-Profile=<profile> |
| Packet-Contains=<binary pattern> | Activate-Rule=<rule ID> |
| | or <rule group ID> |

-continued

| Qualifiers | Action |
|---|---|
| | Deactivate-Rule=<rule ID> |
| | or <rule group ID> |
| | Null-Action |
| Event: Voice-Call-Dialed | |
| Number=<phone number> | Log-Event |
| Time-Of-Day=<start-time>/ | Hang-Up |
| <end time> | Set-Threat-Level=<level> |
| | Set-Behavior-Profile=<profile> |
| | Activate-Rule=<rule ID> |
| | or <rule group ID> |
| | Deactivate-Rule=<rule ID> |
| | or <rule group ID> |
| | Null-Action |
| Event: Voice-Call-Incoming | |
| Number=<phone number> | Log-Event |
| Time-Of-Day=<start-time>/ | Hang-Up |
| <end time> | Set-Threat-Level=<level> |
| | Set-Behavior-Profile=<profile> |
| | Activate-Rule=<rule ID> |
| | or <rule group ID> |
| | Deactivate-Rule=<rule ID> |
| | or <rule group ID> |
| | Null-Action |
| Event: Silent-Call-Answer | |
| Number=<phone number> | Log-Event |
| | Hang-Up |
| | Set-Threat-Level=<level> |
| | Set-Behavior-Profile=<profile> |
| | Activate-Rule=<rule ID> |
| | or <rule group ID> |
| | Deactivate-Rule=<rule ID> |
| | or <rule group ID> |
| | Null-Action |

7 CONCLUSION

Thus the present invention provides important methods, software, systems, and devices for securing wireless mobile devices. Although various specific embodiments and examples have been described herein, those having ordinary skill in the art will understand that many different implementations of the invention can be achieved without departing from the spirit or scope of this disclosure. For example, encryption and decryption can be performed using a single software module or more than two software modules. The modules described herein can be implemented using a variety of techniques and can be part of the operating system as well as plug-ins. Still other variations will be clear to those having ordinary skill in the art.

What is claimed:

1. A wireless mobile electronic communications device comprising:
   electronic apparatus configured to send and receive signals using a GSM protocol;
   a subscriber identity module ("SIM") device, said SIM including electronic hardware and computer software executed by said electronic hardware such that said SIM is configured to send, receive, and process messages using a Short Message System ("SMS") between said wireless mobile electronic communications device and a communications network; and
   said SIM device is configured to control at least partly electronic hardware and computer software executed by said electronic hardware effective to provide a firewall, said firewall being deployed as a SIM application within said SIM device, said firewall being controlled by said SIM device, for said wireless mobile electronic communications device, and said firewall is configured to identify and mediate one or more infrastructure SMS messages sent and received by said device.

2. The wireless mobile communications device of claim 1, wherein said infrastructure SMS messages are "type 0" SMS messages.

3. The wireless mobile communications device of claim 1, wherein said firewall is configured to identify and optionally mediate one or more "type 0" SMS messages.

4. The wireless mobile communications device of claim 1, wherein said firewall is embedded into the operating system of said wireless mobile communications device.

5. The wireless mobile communications device of claim 4, wherein said firewall is a design feature of said operating system.

6. The wireless mobile communications device of claim 4, wherein said firewall is a modification of said operating system of said wireless mobile communications device.

7. The wireless mobile communications device of claim 1, wherein said firewall is separate from said operating system of said wireless mobile communications device.

8. The wireless mobile communications device of claim 7, wherein said firewall is an application instantiated on said wireless mobile communications device.

9. The wireless mobile communications device of claim 1, wherein said firewall is a component of the SMS message processing scheme of said wireless mobile communications device.

10. The wireless mobile communications device of claim 1, wherein said firewall mediates one or more infrastructure SMS messages sent between said SIM card and said electronic apparatus.

11. The wireless mobile communications device of claim 10, wherein said firewall mediates one or more "type 0" messages sent between said SIM and said electronic apparatus.

12. In a wireless mobile communications device configured to send and receive data using a GSM protocol and including a subscriber identity module ("SIM") including electronic hardware and computer software executed by said hardware such that said SIM is configured to send, receive, and process messages using a Short Message System ("SMS") between said wireless mobile communications device and a communications network, a method for mediating SMS messages comprising: configuring said SIM device to control at least partly electronic hardware for said wireless mobile communications device to implement a firewall on said wireless mobile communications device, said firewall being controlled by said SIM device, said firewall configured to identify and mediate one or more infrastructure SMS messages sent and received by said device, and said firewall being deployed as a SIM application within said SIM device.

13. The method of claim 12, wherein said configuring comprises providing said wireless mobile communications device with computer software configured to enable said hardware to implement said firewall.

14. The method of claim 13, wherein said providing computer software comprises providing an operating system including said software for said wireless mobile communications device.

15. The method of claim 14, wherein said providing computer software comprises modifying said operating system of said wireless mobile communications device to include said software.

16. The method of claim 12, wherein said providing computer software comprises providing a software application configured to implement said firewall on said wireless mobile communications device.

17. The method of claim 12 wherein said infrastructure messages are "type 0" SMS messages.

18. The method of claim 17, further comprising mediating said infrastructure SMS messages sent between said SIM device and said communications network.

19. The method of claim 12, further comprising mediating said infrastructure SMS messages sent between said SIM device and said communications network.

20. A non-transitory computer-readable medium containing computer-readable program code devices thereon, said computer-readable program code devices configured for execution on computer hardware of a wireless mobile communications device, said wireless mobile communications device configured to send and receive data using a GSM protocol and including a subscriber identity module ("SIM") including electronic hardware and computer software executed by said hardware such that said SIM is configured to send, receive, and process messages using a Short Message System ("SMS") between said wireless mobile communications device and a communications network, said computer-readable programmed code devices comprising computer instructions for configuring said SIM device to control at least partly said wireless mobile communications device to implement a firewall for said wireless mobile communications device, said firewall being controlled by said SIM device, said firewall configured to identify and mediate one or more infrastructure SMS messages sent and received by said device, and said firewall being deployed as a SIM application within said SIM device.

21. The non-transitory computer-readable medium of claim 20, wherein said computer-readable program code devices further comprise computer instructions for configuring said wireless mobile communications device to identify and optionally mediate "type 0" SMS messages.

* * * * *